United States Patent
Juan et al.

(10) Patent No.: US 12,067,267 B2
(45) Date of Patent: Aug. 20, 2024

(54) MANAGING DATA RELIABILITY IN SEMICONDUCTOR DEVICES

(71) Applicant: Macronix International Co., Ltd., Hsinchu (TW)

(72) Inventors: Shih-Chou Juan, Taoyuan (TW); Wei-Yan Jang, Kaohsiung (TW)

(73) Assignee: Macronix International Co., Ltd., Hsinchu (TW)

( * ) Notice: Subject to any disclaimer, the term of this patent is extended or adjusted under 35 U.S.C. 154(b) by 61 days.

(21) Appl. No.: 18/082,932

(22) Filed: Dec. 16, 2022

(65) Prior Publication Data
US 2024/0201875 A1 Jun. 20, 2024

(51) Int. Cl.
*G06F 3/06* (2006.01)
(52) U.S. Cl.
CPC .......... *G06F 3/0625* (2013.01); *G06F 3/0653* (2013.01); *G06F 3/0679* (2013.01)
(58) Field of Classification Search
CPC .............................. G06F 3/0625; G06F 3/0653
See application file for complete search history.

(56) References Cited

U.S. PATENT DOCUMENTS

| | | | |
|---|---|---|---|
| 8,830,743 B2 | 9/2014 | Cho et al. | |
| 9,329,934 B2 | 5/2016 | D'Abreu et al. | |
| 9,639,419 B2 | 5/2017 | Lin et al. | |
| 2014/0380109 A1* | 12/2014 | Kim | G11C 11/5642 |
| | | | 714/721 |

FOREIGN PATENT DOCUMENTS

TW I582779 5/2017

* cited by examiner

*Primary Examiner* — Jae U Yu
(74) *Attorney, Agent, or Firm* — Fish & Richardson P.C.

(57) ABSTRACT

A system includes a semiconductor device configured to store data and a controller communicatively coupled to the semiconductor device. The semiconductor device and the controller are configured to; in response to determining that particular data stored in the semiconductor device satisfies a reliability condition, obtain first readout data by reading the particular data at a first read voltage, and obtain second readout data by reading the particular data at a second read voltage. The second read voltage is different from the first read voltage. The semiconductor device and the controller are configured to compare the first readout data and the second readout data and obtain a comparison result; and, based on the comparison result, determine whether to perform an error correction process on the particular data.

20 Claims, 16 Drawing Sheets

MANAGING DATA RELIABILITY IN SEMICONDUCTOR DEVICES

BACKGROUND

Once a memory cell in a data storage device such as a semiconductor memory device is programmed, data can be read from the memory cell by applying a voltage to the memory cell and sensing a corresponding cell current. A result of the readout depends on the threshold voltage of the memory cell. However, the threshold voltage of a memory cell—and, correspondingly, the overall threshold voltage distribution of the semiconductor device—can change over time due to one or more factors.

SUMMARY

The present disclosure describes systems and techniques for measuring data reliability in a semiconductor device, e.g., a memory device such as flash memory. Two or more readout data are read from the semiconductor device at respective different read voltages, and the readout data are compared to one another. Based on a result of the comparison, such as a level of match/mismatch between the readout data, it can be determined whether to proceed with an error correction process.

Some aspects of the present disclosure feature a system including a semiconductor device configured to store data and a controller communicatively coupled to the semiconductor device. The semiconductor device and the controller are configured to; in response to determining that particular data stored in the semiconductor device satisfies a reliability condition, obtain first readout data by reading the particular data at a first read voltage, and obtain second readout data by reading the particular data at a second read voltage. The second read voltage is different from the first read voltage. The semiconductor device and the controller are configured to compare the first readout data and the second readout data and obtain a comparison result; and, based on the comparison result, determine whether to perform an error correction process on the particular data.

Implementations of this and other described systems can have one or more of at least the following characteristics.

In some implementations, the semiconductor device includes a first page buffer and a second page buffer. The semiconductor device is configured to: store the first readout data in the first page buffer, store the second readout data in the second page buffer, and compare the first readout data in the first page buffer and the second readout data in the second page buffer and obtain the comparison result.

In some implementations, the semiconductor device includes at least one plane, and each plane of the at least one plane includes a memory array. The semiconductor device further includes page buffer circuitry coupled to the at least one plane. The page buffer circuitry includes at least two page buffers for each plane of the at least one plane. The particular data is stored in a particular plane of the at least one plane, and the first page buffer and the second page buffer are associated with the particular plane of the at least one plane.

In some implementations, the controller is configured to receive the comparison result from the semiconductor device; in response to determining that the comparison result satisfies a threshold condition, obtain the particular data from the semiconductor device; and perform the error correction process on the particular data.

In some implementations, the controller is configured to read the particular data from the semiconductor device at the first read voltage, obtain the first readout data, and store the first readout data: read the particular data from the semiconductor device at the second read voltage, obtain the second readout data, and store the second readout data; and compare the first readout data and the second readout data and obtain the comparison result.

In some implementations, the controller is configured to, in response to determining that the comparison result satisfies a threshold condition, read the particular data from the semiconductor device; and perform the error correction process on the particular data.

In some implementations, the controller is configured to, in response to determining that the particular data satisfies a data refresh condition based on a result of the error correction process, perform a data refresh operation on the particular data.

In some implementations, the controller includes an ECC circuit configured to perform the error correction process. The controller is configured to determine that the particular data satisfies the data refresh condition based on the result of the error correction process by determining that a number of errors detected in the particular data by the ECC circuit exceed a data refresh threshold for the ECC circuit.

In some implementations, determining that the particular data stored in the semiconductor device satisfies the reliability condition is based on at least one of a number of reads performed on the particular data, a number of writes performed on the particular data, a number of erases performed on the particular data, or a lapsed time period since the particular data was stored in the semiconductor device.

In some implementations, the first readout data includes a first plurality of bits, and the second readout data includes a second plurality of bits. Comparing the first readout data and the second readout data and obtaining the comparison result includes performing a bitwise comparison between the first plurality of bits and the second plurality of bits, and the comparison result is based on a number of bits that do not match between the first plurality of bits and the second plurality of bits.

In some implementations, a voltage difference between the first read voltage and the second read voltage is in a range between 0.05 V and 0.2 V.

In some implementations, the first read voltage and the second read voltage are intermediate between two highest-level threshold voltage distribution peaks of cells of the semiconductor device.

In some implementations, values of the first read voltage and the second read voltage are stored as default values in the semiconductor device; or the controller is configured to determine at least one of the first read voltage or the second read voltage based on a usage level of the semiconductor device.

In some implementations, the semiconductor device includes a NAND Flash memory device.

In some implementations, the semiconductor device is a first semiconductor device, and the system further includes a second semiconductor device. The controller is configured to cause the first semiconductor device and the second semiconductor device to each read respective particular data at respective two different read voltages.

In some implementations, the controller is configured to send first commands to the first semiconductor device to cause the first semiconductor device to read first particular data at first different read voltages and obtain a first pair of readout data, and to compare the first pair of readout data and obtain a first comparison result; send second commands to the second semiconductor device to cause the second semiconductor device to read second particular data at second different read voltages and obtain a second pair of readout data, and to compare the second pair of readout data and obtain a second comparison result; and sequentially receive the first comparison result and the second comparison result. The first commands are at least partially interleaved with the second commands.

In some implementations, determining that the particular data satisfies the reliability condition includes determining that a storage unit of the semiconductor device satisfies the reliability condition. The particular data is a subset of data stored in the storage unit.

Some aspects of this disclosure feature a semiconductor device, such as a memory device. The semiconductor device includes a first page buffer; a second page buffer; and circuitry. The circuitry is configured to obtain first readout data by reading particular data on the memory device at a first read voltage, store the first readout data in the first page buffer, and obtain second readout data by reading the particular data on the memory device at a second read voltage. The second read voltage is different from the first read voltage. The circuitry is further configured to store the second readout data in the second page buffer, and compare the first readout data and the second readout data and obtain a comparison result.

This and other semiconductor devices described herein can have at least characteristics as described above in relation to the system including a controller and a semiconductor device. For example, in some implementations the semiconductor device includes at least one plane, each plane of the at least one plane including a memory array. The semiconductor device can further include page buffer circuitry coupled to the at least one plane. The page buffer circuitry includes at least two page buffers for each plane of the at least one plane. The particular data can be stored in a particular plane of the at least one plane, and the first page buffer and the second page buffer can be associated with the particular plane.

Some aspects of this disclosure feature a computer-implemented method. The method includes, in response to determining that particular data stored in a semiconductor device satisfies a reliability condition, obtaining first readout data by reading the particular data at a first read voltage, and obtaining second readout data by reading the particular data at a second read voltage, where the second read voltage is different from the first read voltage; comparing the first readout data and the second readout data and obtaining a comparison result; and, based on the comparison result, determining whether to perform an error correction process on the particular data.

This and other methods described herein can have characteristics and include processes at least as described above in relation to the system including a controller and a semiconductor device.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION

Figure 1A:
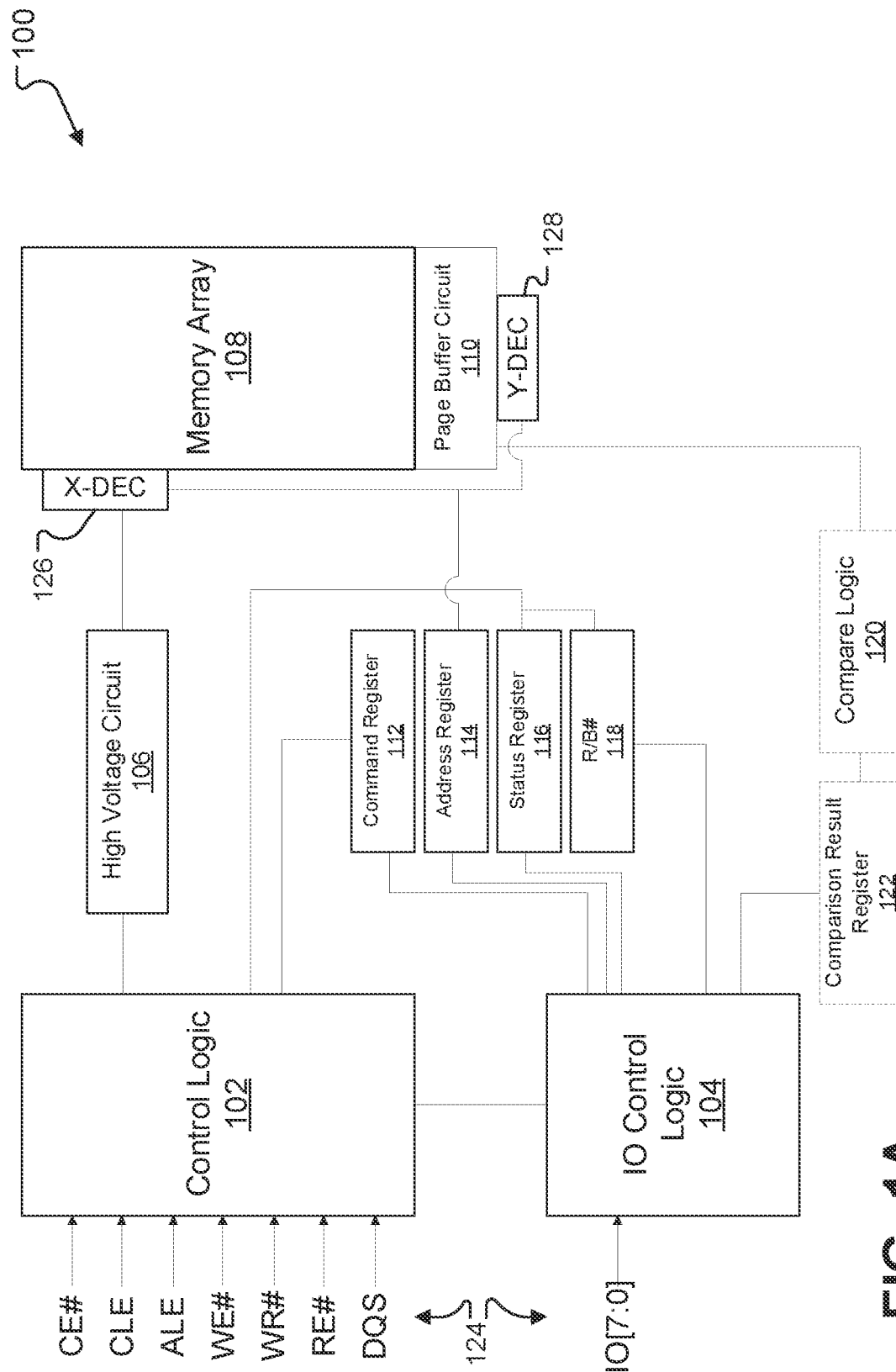
FIGS. 1A-1B illustrate an example of a semiconductor device, according to one or more implementations of the present disclosure.

Due to frequent read operations, a semiconductor memory, e.g., flash memory, may suffer from read disturbance, in which states of memory cells, e.g., an erased state and one or more programmed states, in the memory may have increased threshold voltages. Additionally, or alternatively, a memory may suffer from data retention degradation, in which programmed in states of memory cells may have decreased threshold voltages, e.g., due to high temperatures. The read disturbance and/or data retention degradation may cause failed bits (or error bits) in reading the data. Moreover, with decreasing inter-cell distances as data storage density increases, read errors caused by inter-cell coupling become more likely to occur.

An error correction code (ECC) decoder can be configured to decode data read from the memory to detect and correct, up to an error correction capability of an ECC circuit, any bit errors that may be present in the data. An ECC is written to the memory after programming, and a suitable error correction scheme, such as a Hamming code-based scheme, can be used to correct errors when the data is read.

As data is stored for longer periods of time, the number of error bits in the data also tends to increase. ECC methods or circuits may have an upper limit of correctable bits: if the number of error bits exceeds the limit, the error correction scheme may not be able to correct all errors. A data refresh operation can be performed based on a result of error correction processing. However, both the error correction process and the data refresh operation can consume system resources, such as power, processing resources, and bandwidth. If the error correction process or the data refresh operation are performed unnecessarily, such as when a number of error bits is small, those resources are wasted.

Implementations of the present disclosure provide methods, devices, systems, and techniques for performing an error analysis on particular data prior to performing an error correction process. The error analysis constitutes a "checkpoint" based on which the error correction process can be performed or not performed, helping to preserve system resources.

In some implementations, the error analysis is performed by reading particular data (e.g., data in a particular page of memory) using two or more different read voltages. The two or more resulting readout data are compared to one another to identify mismatches, e.g., mismatched bits. A sufficiently high level of mismatch indicates a high degree of errors in the storage of the particular data, e.g., indicates that the memory is suffering from read disturbance and/or data retention degradation. In response, an error correction process can be performed.

In some implementations, a semiconductor device storing data (e.g., a memory) is configured to facilitate the error analysis process. For example, the semiconductor device can include multiple buffers for each unit of memory (e.g., two page buffers for each plane of memory) to which the multiple readout data can be stored. The semiconductor device can include circuitry configured to compare the multiple readout data, e.g., to implement a bitwise XOR operation on the multiple readout data. In some implementations, the semiconductor device includes circuitry to store a result of the comparison, e.g., a comparison result register.

The techniques and circuit configurations can be implemented for any type of semiconductor device that stores data to be transferred to another device or portion of a device. In some implementations, because of the checkpoint provided by processes described herein, system resource usage is decreased, such as power usage, processor usage, and/or bandwidth usage. In some implementations, system resources can be reduced by performing readout data comparison on the semiconductor device, avoiding usage of resources to transfer readout data from the semiconductor device to a controller.

The techniques described herein can be applied to different types of storage and memory systems, e.g., two-dimensional (2D) storage and memory systems or three-dimensional (3D) storage memory systems. The techniques can be applied to various storage and memory types, such as SLC (single-level cell) devices, or MLC (multi-level cell) devices like 2-level cell devices or TLC (triple-level cell) devices. The techniques can be applied to various types of non-volatile storage and memory devices, such as Static Random Access Memory (SRAM), Dynamic Random Access Memory (DRAM), flash memory such as NOR flash memory and/or NAND flash memory, resistive random-access memory (RRAM), magnetoresistive random-access memory (MRAM), or phase-change random-access memory (PCRAM), among others. Additionally or alternatively, the techniques can be applied to various types of devices and systems, such as secure digital (SD) cards, embedded multimedia cards (eMMC), solid-state drives (SSDs), or embedded systems, among others.

FIG. 1 illustrates an example of a semiconductor device 100. For example, the semiconductor device 100 can be a memory, such as a NAND flash memory die. The semiconductor device 100 is provided with basic circuit blocks, such as control logic 102, IO control logic 104, a high voltage circuit 106, a memory array 108, an X-decoder 126, a Y-decoder 128, a command register 112, an address register 114, a status register 116, and an R/B #(read/busy) module 118. These basic circuit blocks together operate to read data from and store data in the memory array 108 and to receive data from and output data to one or more other devices, such as controllers: a detailed description of the circuit blocks and their operation is omitted here.

The semiconductor device 100 can include pins 124 to send signals to and/or receive signals from one or more other devices, such as controllers. In the example of FIG. 1, the pins 124 include CE #, CLE, ALE, WE #, WR #, RE #, DQS, and IO[7:0]. The CE #(chip enable) pin is configured to receive chip enable signals from a controller (e.g., controller 200) to select the semiconductor device 100 for signal exchange. The CLE (command latch enable) and ALE (address latch enable) pins are configured to receive indications of types of bus cycle (e.g., command, address, and data). The WE #(write enable) pin is configured to receive signals to control latching of commands, addresses, and data. The WR #(write) pin is configured to be driven for write cycles. The RE #(read enable) pin is configured to receive a signal from a controller indicating that the controller is ready to read data from the semiconductor device 100. The DQS (strobe signal) pin is configured to output (e.g., to a controller) a data strobe signal that indicates timing for data transfer. The IO[7:0] pins are configured for data input/output.

In some implementations, one or more of these pins are not included, e.g., have functions integrated together with another described pin or have functions that are not implemented. Moreover, in some implementations a semiconductor device includes one or more additional pins without departing from the scope of this disclosure.

The memory array 108 includes a plurality of blocks. The memory array 108 can be a two-dimensional (2D) memory array including 2D memory blocks. The memory array 108 can be a three-dimensional (3D) memory array including 3D memory blocks. Each block can include a same number of pages, or different blocks can include different number of pages. Each page has a unique number in the block. Data is stored in the pages of the block according to the order of the unique numbers of the pages in the block. Each page can be read or written to separately, and pages in a block can be erased together. In some implementations, a block can be divided into a number of sub-blocks. Each sub-block can include one or more pages. Each page in a sub-block can be read or written to separately. The one or more pages in each sub-block can be erased together.

In some implementations, the memory array 108 in included in a die, and a system can include one or more dies. Each die can be a memory chip and include a number of memory arrays 108 and peripheral circuitry thereon. The memory array 108 can include one plane or multiple planes (e.g., forming a 3D memory), with each plane including a number of physical blocks of memory cells, the memory cells divided between pages. Each plane can itself include a memory array. Accordingly, the memory array 108 can be a macro-memory array that includes at least one plane, and each plane of the at least one plane includes a memory array. Each physical block can include a number of pages of memory cells that can store a number of sectors of data. The high voltage circuit 106 is controlled (e.g., by a controller such as controller 200 or host controller 222) to apply read voltages to word lines of the memory array 108 via the X-decoder 126, to perform corresponding read operations on the memory cells on the word lines. The semiconductor device 100 includes a page buffer circuit 110 to sense voltages on corresponding bit lines to determine states of the memory cells, the sensed voltages corresponding to particular bit values, the page buffer circuit 110 coupled to the at least one plane of the memory array 108.

Figure 1B:
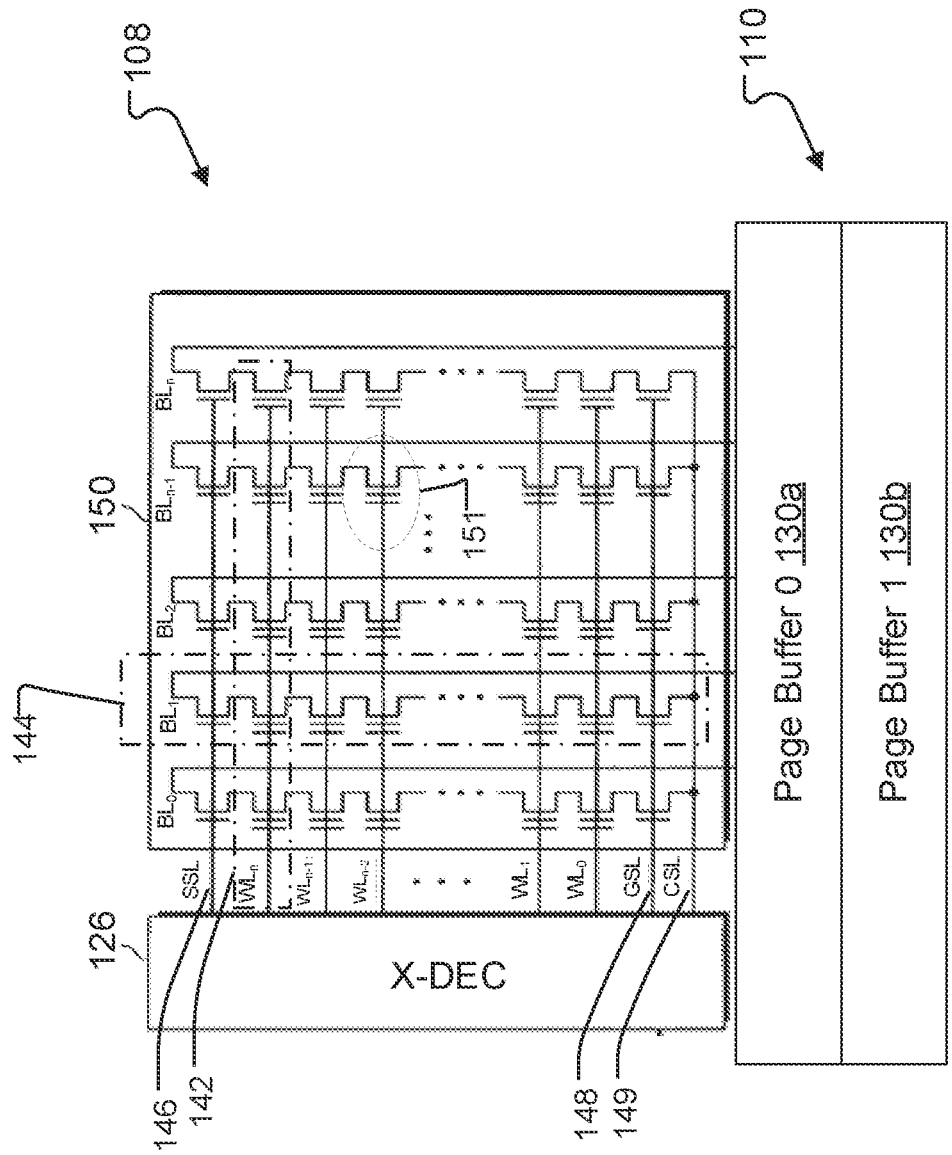

FIG. 1B illustrates a plane 150 of the memory array 108, e.g., one plane of at least one plane 150, such as multiple planes constituting a 3D memory array 108. The plane 150 includes memory cells 151 coupled in series to column bit lines $BL_0$, $BL_1$, ..., $BL_{n-1}$, and $BL_n$ to form a number of cell strings 144, and to row word lines $WL_0$, $WL_1$, ..., $WL_{n-1}$, and $WL_n$ to form a number of pages 142, the memory cells of the plane 150 forming a memory array.

Each memory cell includes a transistor structure having a gate, a drain, a source, and a channel defined between the drain and the source. In some implementations, each memory cell is located at an intersection between a word line and a bit line, where the gate is connected to the word line, the drain is connected to the bit line, and the source is connected to a source line, which in turn is connected to common ground. In some implementations, the gate of a flash memory cell has a dual-gate structure, including a control gate and a floating gate, where the floating gate is suspended between two oxide layers to trap electrons that program the cell.

A cell string 144 can include a number of memory cells 151, a string select transistor (SST), and a ground select transistor (GST), which are all connected in series. A gate of the SST can connected to a string select line (SSL) 146. Gates of the SSTs in different strings are also connected to the same SSL. Gates of the memory cells 151 are respectively connected to word lines $WL_0$, $WL_1$, ..., $WL_{n-1}$, $WL_n$. The cell strings 144 or the memory cells 151 are connected to a common source line (CSL) 149 via the GST. The CSL 149 can be coupled to a ground. A gate of the GST is connected to a ground select line (GSL) 148. Gates of the GSTs in different strings 144 are also connected to the same GSL 148.

A page 142 can include a number of memory cells 151. Gates of the memory cells 151 in the page 142 are coupled in series to a respective word line (WL). When an input voltage is applied to the word line, the input voltage is also applied to the gates of the memory cells 151 in the page 142. To read a particular page 142 in the plane 150 in a read operation, a lower read voltage is applied onto a word line corresponding to the particular page 142. Meanwhile, a higher voltage is applied onto other pages in the plane 150 (by corresponding word lines of the other pages), such as adjacent page(s) and/or all other pages.

The page buffer circuit 110 coupled to the memory array 108 can include one or more page buffers. For example, the page buffer circuit 110 can include one page buffer for each plane 150 of the memory array 108 or can include two page buffers for each plane 150 of the memory array 108. As shown in FIG. 1B, the page buffer circuit 110 coupled to the plane 150 includes two page buffers 130a, 130b (collectively referred to as page buffers 130) corresponding to the plane 150. The page buffer circuit 110 can further include additional pairs of page buffers 130 corresponding to potential additional planes 150 of the memory array 108.

A page buffer 130 (e.g., page buffer 130a and page buffer 130b) can include one or more latches and/or logic gates for at least one logic operation. For example, the page buffer(s) 130 can be n-bit page buffers configured to obtain and store data from a page 142 that stores n bits of data or a plane 150 that stores n bits of data, obtained in a read operation on the page 142 or the plane 150. For example, in a read operation, a read voltage is applied to memory cells 151 of a given page 142 of the memory array 108 using a corresponding word line. Data stored in the page 142 is read to and stored (as "readout data") in a page buffer 130 associated with the plane 150 having the page 142, via bit lines coupled to the page buffer 130. For example, each page buffer 130a, 130b can include one sub-circuit for each bit line of the plane 150, for obtaining and storing data in a corresponding cell string 144 on the bit line. From the page buffer(s) 130, the readout data can be output to one or more other devices, such as to controller 200 and/or host device 220 illustrated in FIG. 2.

In some implementations that include two page buffers 130 for each plane 150 of the memory array 108, the two page buffers 130a, 130b are configured to store readout data independently and simultaneously. For example, in a two-voltage readout operation, a first read voltage can be applied to memory cells of a particular plane 150, and obtained first readout data can be stored in a first page buffer 130a corresponding to the particular plane 150. A second, different read voltage can then be applied to the same memory cells of the particular plane 150, and second obtained readout data (which may or may not be different from the first obtained readout data) can be stored in a second page buffer 130b corresponding to the particular plane 150 while the first readout data remains stored in the first page buffer 130a.

In some implementations, the page buffer circuit 110 can include more than two page buffers for each plane 150, e.g., three or more page buffers for each plane 150. Accordingly, readout data corresponding to three or more different read voltages can be stored simultaneously on the memory for comparison.

Implementations of the semiconductor device 100 that include two or more page buffers 130a. 130b for each plane 150 can include corresponding circuitry configured to perform operations on readout data stored in the two or more page buffers 130a. 130b. As shown in FIG. 1A, compare logic 120 is configured to perform comparison operation(s) on the readout data to obtain a comparison result, such as a bitwise XOR operation followed by summation. Further details on the comparison operation(s) are provided in reference to FIG. 5. A comparison result register 122 is configured to obtain the comparison result, as determined by the compare logic 120. From the comparison result register 122, the comparison result can be output to one or more other devices, such as to controller 200 and/or host device 220) illustrated in FIG. 2. The compare logic 120 and the comparison result register 122 need not be included in some implementations, e.g., in implementations that include only a single page buffer 130 for each plane 150.

Figure 2:
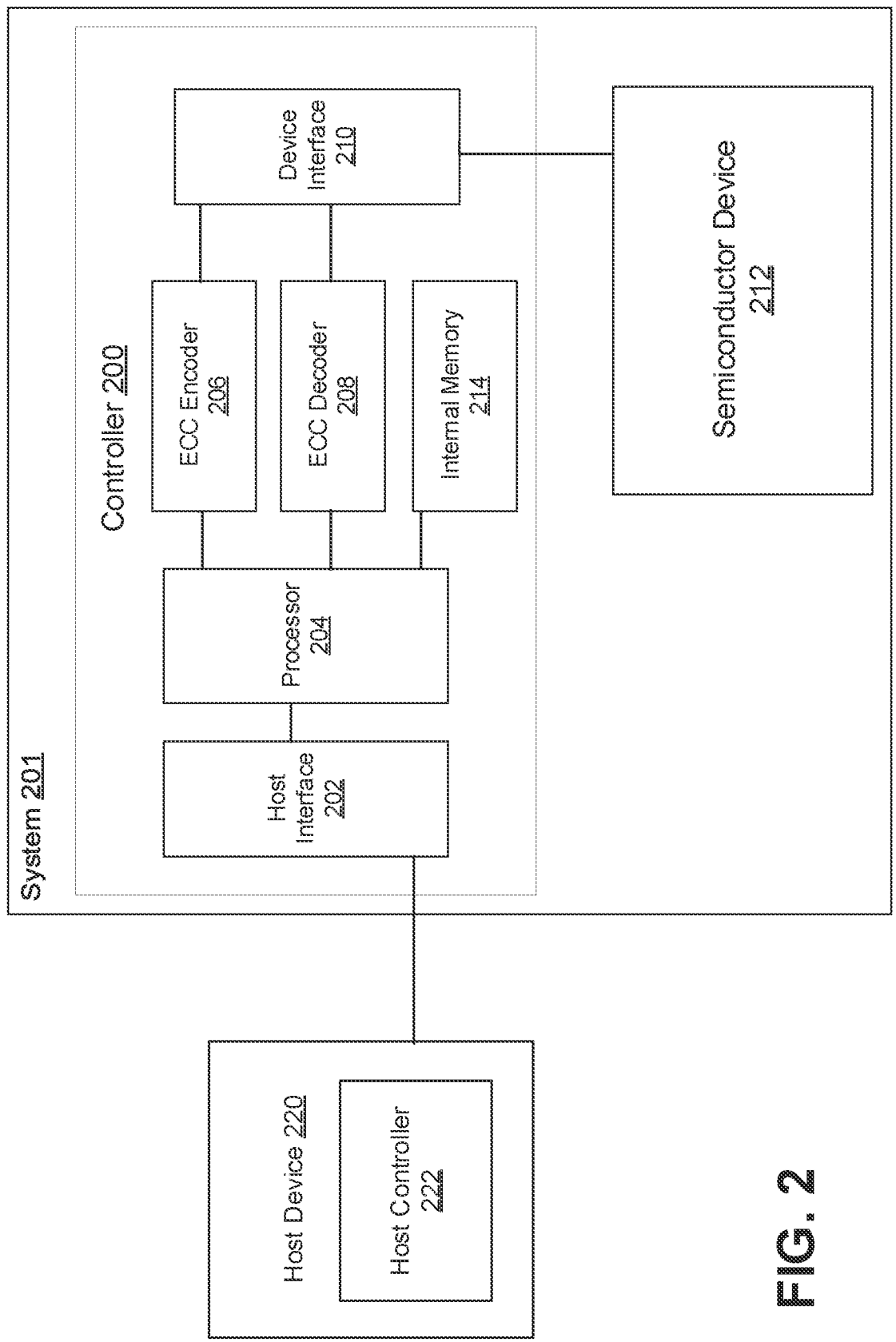
FIG. 2 illustrates an example of a system including a controller and a semiconductor device, according to one or more implementations of the present disclosure.

FIG. 2 illustrates an example of a system 201 including a controller 200 and a semiconductor device 212 (e.g., semiconductor device 100, such as a memory). The controller 200 can include pins (not shown) of a device interface 210 and/or a host interface 202 for outputting signals to and receiving signals from the semiconductor device 212 and/or another device, such as a host device. The controller 200 includes a processor 204 and an internal memory 214. In some implementations, the system 201 includes a plurality of semiconductor devices 212 (e.g., a plurality of memories) that are coupled to the controller 200. In some implementations, the system 201 is implemented as a device that includes both the controller 200 and the semiconductor device 212. For example, the controller 200 can be a device controller of the device 201. In some implementations, the device 201 is a memory device.

In some implementations, a host device 220 is communicatively coupled to the controller 200 by a host interface 202 of the controller 200. The host device 220 includes a host controller 222 that can include at least one processor and at least one memory coupled to the at least one processor and storing programming instructions for execution by the at least one processor to perform one or more corresponding operations.

In some implementations, the system 201 is a storage device. For example, the system 201 can be an embedded multimedia card (eMMC), a secure digital (SD) card, a solid-state drive (SSD), or some other suitable storage. In some implementations, the system 201 is a smart watch, a digital camera, or a media player. In some implementations, the system 201 is a client device that is coupled to the host device 220. For example, the system 201 can be an SD card in a digital camera or a media player that is the host device 220.

The controller 200 can be a general-purpose microprocessor or an application-specific microcontroller. In some implementations, the controller 200 is a memory controller for the semiconductor device 212. The following sections describe various techniques based on implementations in which the controller 200 is a memory controller. However, the techniques described in the following sections are also applicable in implementations in which the controller 200 is another type of controller that is different from a memory controller.

The processor 204 is configured to execute instructions and process data. The instructions include firmware instructions and/or other program instructions that are stored as firmware code and/or other program code, respectively, in a memory, such as the internal memory 214 or a secondary memory. The data includes program data corresponding to the firmware and/or other programs executed by the processor, among other suitable data. In some implementations, the processor 204 is a general-purpose microprocessor, or an application-specific microcontroller. The processor 204 can be referred to as a central processing unit (CPU).

The processor 204 accesses instructions and data from the internal memory 214. In some implementations, the internal memory 214 is a Static Random Access Memory (SRAM) or a Dynamic Random Access Memory (DRAM). For example, in some implementations, when the system 201 is an eMMC, an SD card or a smart watch, the internal memory 214 is an SRAM. In some implementations, when the system 201 is a digital camera or a media player, the internal memory 214 is DRAM.

In some implementations, the internal memory is a cache memory that is included in the controller 200. The internal memory 214 stores instruction codes, which correspond to the instructions executed by the processor 204, and/or the data that are requested by the processor 204 during runtime. The controller 200 transfers the instruction code and/or the data from the semiconductor device 212 to the internal memory 214 over a device interface 210. In some implementations, the semiconductor device 212 is a non-volatile memory that is configured for long-term storage of instructions and/or data, e.g., a NAND flash memory device, or some other suitable non-volatile memory device. In implementations where the semiconductor device 212 is NAND flash memory, the system 201 can be a flash memory device, e.g., a flash memory card, and the controller 200 can be a NAND flash controller. For example, in some implementations, when the system 201 is an eMMC or an SD card, the semiconductor device 212 is a NAND flash; in some implementations, when the system 201 is a digital camera, the semiconductor device 212 is an SD card; and in some implementations, when the system 201 is a media player, the semiconductor device 212 is a hard disk.

In some implementations, the controller 200 includes an ECC circuit including an ECC encoder 206 and an ECC decoder 208. The ECC encoder 206 can be configured to receive data to be stored to the semiconductor device 212 and to generate a codeword, e.g., by encoding the data using an ECC encoding scheme. The ECC encoder 206 can include, for example, a Reed Solomon encoder, a Bose-Chaudhuri-Hocquenghem (BCH) encoder, a low-density parity check (LDPC) encoder, a Turbo Code encoder, or any combination thereof. The ECC decoder 208 can be configured to decode data read from the semiconductor device 212 to detect and correct, up to an error correction limit of the ECC scheme, any bit errors that may be present in the data. In some implementations, the ECC circuit including the ECC encoder 206 and the ECC decoder 208 is included in the semiconductor device 212. In some implementations, the controller 200 includes a first ECC circuit, and the semiconductor device includes a second ECC circuit.

Figure 3:
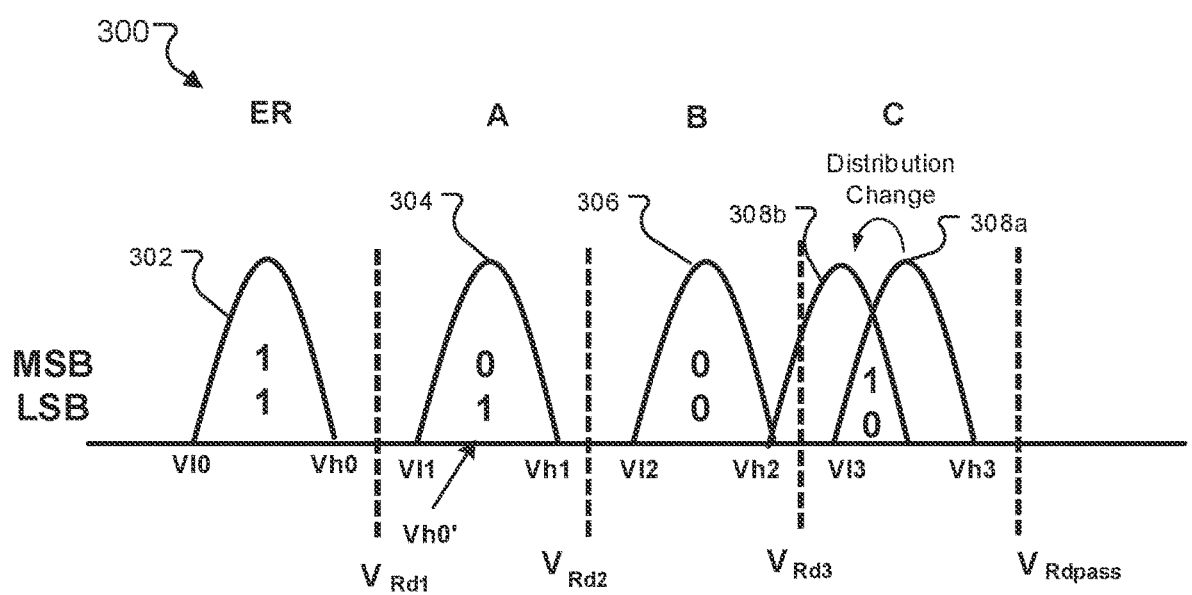
FIG. 3 illustrates an example of a threshold voltage distribution, according to one or more implementations of the present disclosure.

FIG. 3 illustrates an example 300 of threshold voltage distributions and read voltages for different states of a memory cell of a memory, according to one or more implementations. The memory can be the semiconductor device 100 of FIG. 1, e.g., a NAND flash memory. For illustration purposes only, the memory cell is an MLC capable of storing two-bit data.

The memory cell can be programmed or erased to have any one of four states: ER, A, B, and C. In some implementations, ER is an erased state (1, 1), and A, B, C are programmed states (0, 1), (0, 0), and (1, 0). The states ER, A, B and C have progressively higher read voltages. The MLC NAND flash memory can partition the two bits of each memory cell in a word line across two pages, which are the unit of data programmed at a time. The least significant bits (LSBs) of all memory cells in one word line form the LSB page of the word line, and the most significant bits (MSBs) of these cells on the word line form the MSB page of the word line.

Once programmed or erased, the memory cell has a corresponding threshold voltage. The threshold voltage is a characteristic of the memory cell. For example, the memory cell can be a floating gate transistor. When a read voltage higher than or identical to the threshold voltage is applied to a gate of the memory cell, the memory cell is turned on. When a read voltage lower than the threshold voltage is applied to a gate of the memory cell, the memory cell is turned off. The read action is not a program or erase action and is not intended to change a state of the memory cell.

Due to cell-to-cell variation, each state corresponds to a distribution of threshold voltages in a range between a lower limit voltage and a higher limit voltage. A memory cell having a threshold voltage within the range is considered to be in the corresponding state. In other words, a memory cell in a state has a threshold voltage within the range corresponding to the state. For example, if the memory cell has a threshold voltage between Vl0 and Vh0, the memory cell is in the state ER: if the memory cell has a threshold voltage between Vl1 and Vh1, the memory cell is in the state A: if the memory cell has a threshold voltage between Vl2 and Vh2, the memory cell is in the state B; and if the memory cell has a threshold voltage between Vl3 and Vh3, the memory cell is in the state C. Curves 302, 304, 306, and 308a show threshold voltage distributions of the respective states ER, A, B, C of the memory cell, respectively, for a situation in which all threshold voltage distributions lie within their nominal ranges.

During a read operation, a read voltage can be applied to a word line coupled to a gate of a selected memory cell to determine whether the selected memory cell is in a turned-on or turned-off state. When a read voltage $V_{Rd1}$ that is larger than the threshold voltage of ER but smaller than the threshold voltage of A is applied, the memory cell is turned on when it has the state ER and turned off when it has the state A, B, or C; when a read voltage $V_{Rd2}$ that is larger than the threshold voltage of A but smaller than the threshold voltage of B is applied, the memory cell is turned on when it has the state ER or A and turned off when it has the state B or C; when a read voltage $V_{Rd3}$ that is larger than the threshold voltage of B but smaller than the threshold voltage of C is applied, the memory cell is turned on if it has the state ER, A, or B and off when it has the state C. When the read voltage $V_{Rdpass}$ that is larger than all the threshold voltages of the states ER, A, B, C is applied, the memory cell is turned on regardless of the state the memory cell had.

During the read operation, a pass voltage $V_{Rdpass}$ is applied to other memory cells in the same bit line as the selected memory cell, so that the other memory cells are turned on. Thus, if the selected memory cell is turned on under a read voltage $V_{Rd}$, the memory cells in the corresponding bit line form a conductive path, and there will be a current or a voltage change, which can be detected by a current or voltage sensor coupled to the bit line (e.g., a current or voltage sensor included in a page buffer coupled to the bit line). If the selected memory cell is turned off under the read voltage, the memory cells in the corresponding bit line does not form a conductive path, and there is no current or no voltage detectable by a current or voltage sensor coupled to the bit line.

Over time, in a data retention degradation process, threshold voltages of cells of the memory can decrease. Data retention degradation can be caused by heat, e.g., resulting in gate dielectric breakdown. For example, as illustrated in FIG. 3, a nominal distribution 308a corresponding to state C can change to an altered distribution 308b having a mean value less than a mean value of the nominal distribution 308a. The distribution change can be a substantially uniform shift in the distribution or can include distortion of the distribution (e.g., a change to a shape of the distribution, such as a stretching or narrowing of the distribution to a wider or narrower range of threshold voltages). Data retention degradation is most common for the highest-threshold voltage distribution state (in this example, state C), but can instead or additionally occur for other states, such as states ER, A, and/or B. In addition, due to repeated read operations, a read disturbance phenomenon may occur. In the read disturbance phenomenon, a threshold voltage of the memory cell abnormally increases. For example, distribution 302 can be shifted/stretched towards distribution 304. Read disturbance can occur for the lowest-threshold voltage distribution state (in this example, state ER, which may be more susceptible to read disturbance than higher-threshold voltage distribution states) and/or for other states.

Data retention degradation and read disturbance can cause memory cell states to be read out incorrectly. In some cases, distributions corresponding to different states can overlap one another, such that a given threshold voltage no longer corresponds to a single state. For example, altered distribution 308b overlaps with distribution 306 (e.g., a lowest threshold voltage of the altered distribution 308b is less than or equal to Vh2) and includes threshold voltages less than $V_{Rd3}$. When read voltage $V_{Rd3}$ is applied to read out a memory cell in state C, the memory cell may have a threshold voltage less than $V_{Rd3}$ in the altered distribution 308b, such that the memory cell turns on and appears to be in states ER, A, or B. Accordingly, in a page read operation, one or more incorrect bits (corresponding to one or more memory cells exhibiting data retention degradation and/or read disturbance) can be read out, leading to data integrity issues.

As noted above, an ECC circuit, such as the ECC circuit of the controller 200, can be configured to detect and correct errors in data read from memory cells. However, the ECC circuit may have a correction limit that sets a ceiling on a number of correctable errors (e.g., per page). For example, in an error correction process, when n bits are read from a page or a plane to a page buffer, the ECC circuit may be able to detect and correct up to m bits (m<n). If more than m bits are incorrect, the error correction limit is exceeded. The ECC circuit can be associated with a data refresh threshold that, for example, can be less than m. When a number of the errors exceeds the data refresh threshold, it can be determined to perform a data refresh operation on the page or plane. For example, the controller 200 and/or the semiconductor device 212 can obtain an output of the error correction process, such as a number of incorrect bits p. The controller 200 and/or the semiconductor device 212 can compare p to the data refresh threshold. If p>the data refresh threshold, the controller 200 and/or the semiconductor device 212 determines to perform the data refresh operation. For example, the controller 200 can output commands and/or data to the semiconductor device 212 to cause the semiconductor device 212 to refresh the data stored in the page or plane. In some implementations, instead of or in addition to page-level and/or plane-level ECC and data refresh operations, ECC and data refresh operations can be performed on the level of a different unit of a memory array, such as a block or a sub-block.

However, as noted above, both the error correction process and the data refresh operation consume valuable system resources. Accordingly, it can be advantageous to include a "checkpoint" prior to performance of the error correction process, to limit a range of situations in which the process is performed. One approach is to include a checkpoint based on memory usage data (e.g., read/write cycle counts) that does not include an actual measurement of memory cells in the memory. However, such approaches may not be sufficiently accurate. For example, such approaches may not account for the presence of unpredictable errors due to local heating in particular portions (e.g., pages or planes) of the memory.

Implementations according to this disclosure introduce a checkpoint based on particular data read from a semiconductor device, such as data stored in a particular plane of a memory. The particular data is read twice or more, at two or more different read voltages, to obtain two or more readout data. The two or more readout data are compared to one another to provide a comparison result that is directly indicative of an error state of the particular data, such that a decision on whether to perform error correction can be made more reliably.

Figure 4A:
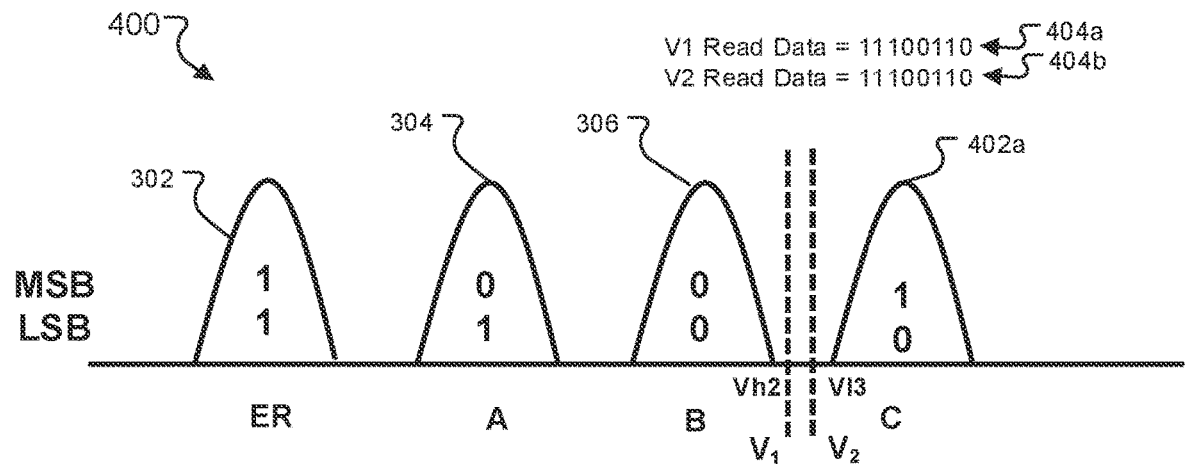
FIGS. 4A-4B illustrate examples of multiple voltage readouts of memory cells, according to one or more implementations of the present disclosure.
Figure 4B:
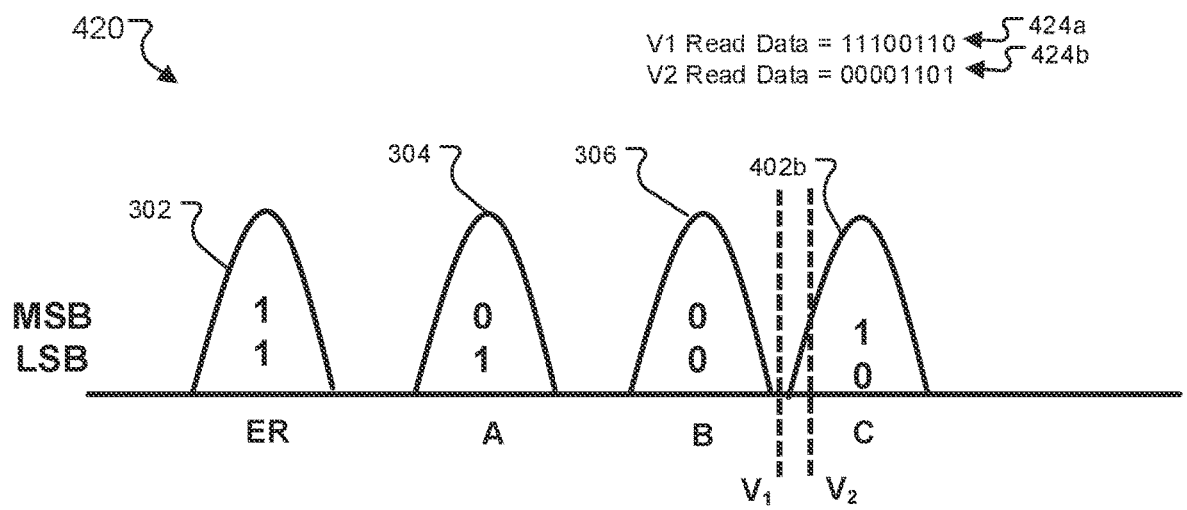

FIGS. 4A-4B illustrate the concept underlying various methods according to this disclosure. FIG. 4A illustrates readout results for a threshold voltage distribution 400 in which appreciable data storage errors (such as data retention degradation and read disturbance) have not occurred. Data is read from the memory cells characterized by the distribution 400 (e.g., from a page, plane, block, or sub-block represented by the distribution 400) using two different read voltages, $V_1$ and $V_2$, that are applied to the memory cells. In this example, both $V_1$ and $V_2$ are in-between distribution 306 (corresponding to state B) and distribution 402a (corresponding to state C). For example, no or substantially no memory cells have a threshold voltage of $V_1$ or $V_2$, e.g., because a highest threshold voltage Vh2 of distribution 306 is less than $V_1$, and a lowest threshold voltage Vl3 of distribution 402a is greater than $V_2$. Moreover, no or substantially no memory cells have a threshold voltage between $V_1$ and $V_2$. Accordingly, readout data resulting from the two data reads match one another or substantially match one another. For example, a bitwise comparison between first readout data 404a, corresponding to read voltage $V_1$, and second readout data 404b, corresponding to read voltage $V_2$, results in no or very few mismatched bit values.

By contrast, in the distribution 420 of FIG. 4B, distribution 402b (corresponding to state C) is shifted compared to distribution 402a. As in FIG. 4A, distribution 402b does not overlap with the first read voltage $V_1$. However, the distribution 402b does overlap with the second read voltage $V_2$, meaning that some memory cells having the state C will be read as off using V1 but read as on using $V_2$. This effect leads to differences between first readout data 424a, corresponding to read voltage $V_1$, and second readout data 424b, corresponding to read voltage $V_2$. Based on these differences (e.g., based on a number of the differences), it can be determined that distribution 402b overlaps with at least one of V1 and V2 and, accordingly, that the distribution 402b is changed compared to distribution 402a, which is substantially non-overlapping with $V_1$ and $V_2$.

This comparison between two readout data, representing readout of the same portion of a storage (such as a common page, plane, block, or sub-block) using two different read voltages, can be used as a checkpoint prior to an error correction process. If the two readout data are similar (e.g., if a number of bitwise differences between the two readout is less than or equal to a threshold value), then it can be determined that the threshold voltage distributions adjacent to the read voltages do not exhibit significant data retention degradation or read disturbance. Accordingly, it can be determined that the resource-intensive error correction process is not needed. By contrast, if the two readout data are sufficiently different (e.g., if a number of bitwise differences is greater than a threshold value), then it can be determined that distribution shift and/or distortion have occurred due to data retention degradation, read disturbance, or another error source, and the error correction process can be performed. The comparison result may be used as a general measure of data errors, and accordingly may be referred to as "soft data," in contrast to the exact bit error counts and error identifications provided by some error correction processes. However, the efficiency of the processes described herein can render even the "soft data" of the comparison results useful as checkpoints prior to more resource-intensive error correction processing.

Figure 5:
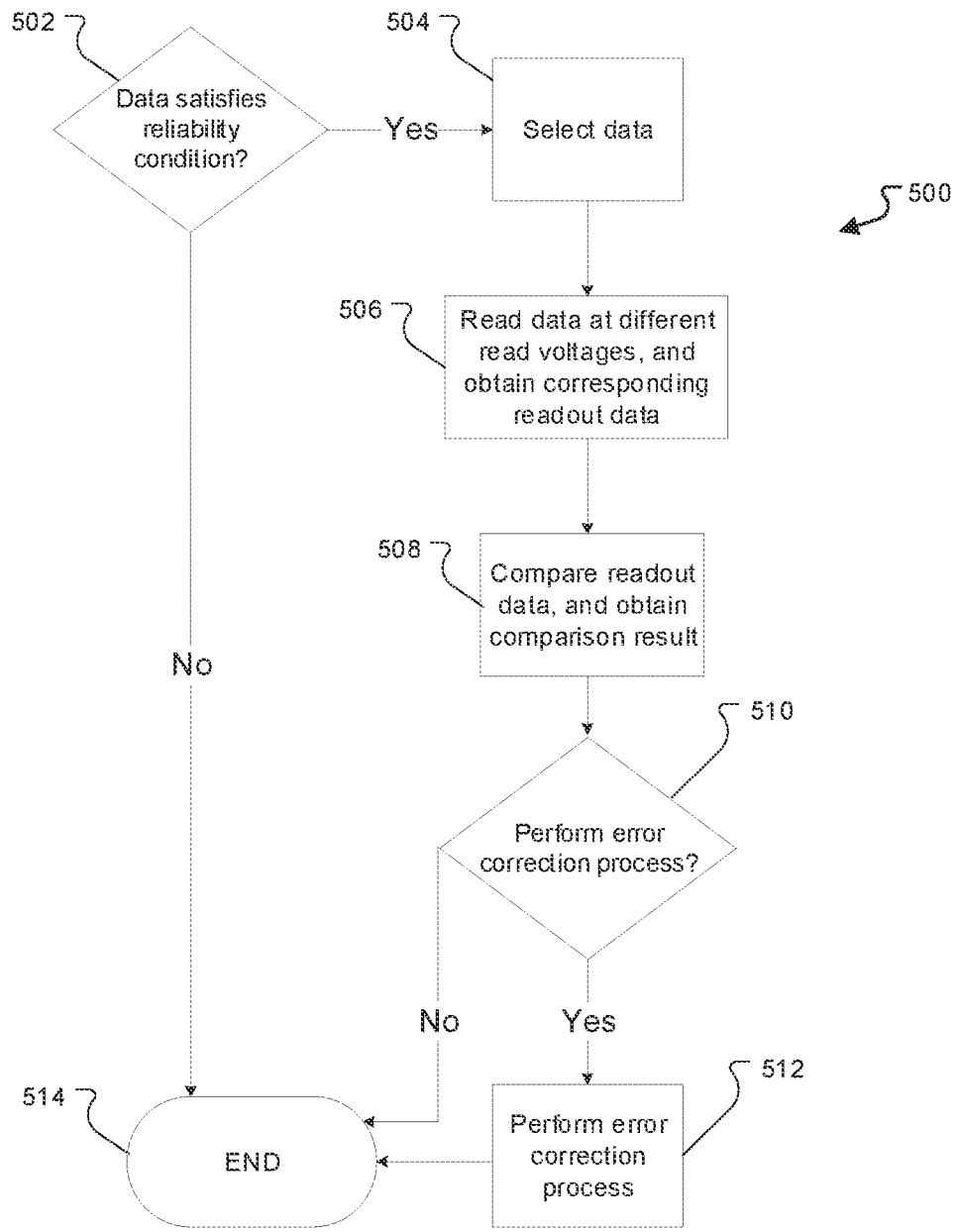
FIG. 5 illustrates an example of an error analysis process, according to one or more implementations of the present disclosure.

FIG. 5 illustrates an example of a process 500 for data error analysis. The process 500 can be performed by a controller (e.g., controller 200 or 222) communicatively coupled to a semiconductor device, the semiconductor device (e.g., semiconductor device 100, such as a memory), or by a controller and semiconductor device in conjunction with one another. For example, the process 500 can be performed by a system that includes a controller and a semiconductor device. For example, the system can be a memory device that includes a memory controller and a memory. Particular examples of the general process 500 are described in reference to FIGS. 6-7. Moreover, although the process 500 is described for two readout different read voltages and two or more corresponding readout data, the process 500 can include three or more different read voltages and three or more corresponding readout data, as described in further detail below.

In the process 500, it is determined whether data in a semiconductor device (e.g., a memory) satisfies a reliability condition (502), where satisfaction of the reliability condition corresponds to a low data reliability. For example, the data can be particular data stored in a particular unit of the memory, such as a page, a plane, a block, or a sub-block of a memory array of the memory. The memory or the controller can store reliability data characterizing usage and/or a current state of the particular unit. The memory or the controller can access the reliability data and use the reliability data to determine whether the reliability condition is satisfied.

For example, in some implementations, the reliability data includes a block information table stored in the controller or the memory. For each unit of the memory (e.g., for each plane, block, sub-block, and/or page), the block information table stores one or more fields characterizing the usage and/or the current state of the unit. An erase count field records a number of times that the unit has been executed by an erase operation. Erase count is related to P/E (program/erase) cycles of the unit. A read count field records how many times each unit (e.g., each page in a block and/or a block as a whole) has been read. A write count field records how many times each unit has been written to. An erase delay time field records a period of time from a latest time point when the unit of memory was erased to a current time point. A storage amount field indicates an amount of data stored in the unit of memory. A lapsed time period field records a lapsed time period since the particular data was stored in the semiconductor device. Other types of reliability data characterizing the usage and/or the current state of units of the memory are also within the scope of this disclosure for use in determining whether the reliability condition is satisfied. Circuitry of the controller or the memory can be configured to analyze the reliability data to determine whether the reliability condition is satisfied.

The reliability data may be correlated with threshold voltage distribution changes. For example, a high number of reads, erases, and/or writes can be associated with increased shifts and/or distortion of threshold voltage distributions from the distributions' nominal states, e.g., by association with increased data retention degradation and/or read disturbance. In some implementations, a function of one or more values of the reliability data is calculated, and a value of the function is compared to a threshold value to determine whether the reliability condition is satisfied (e.g., based on the value of the function being less than or greater than the threshold value). For example, in some implementations, if the controller or the memory determines a number of erase counts is greater than an erase count threshold, a number of read counts is greater than a read count threshold, or the erase delay time is greater than a threshold erase delay time, the controller or the memory determines that the reliability condition is satisfied (502). If the data reliability condition is not satisfied (indicating, for example, a high degree of data reliability), the process 500 ends (514). If the data reliability condition is satisfied, the process 500 continues.

In some implementations, the data reliability condition is satisfied for a unit of memory, and particular data that is to be read at multiple read voltages is stored in a subset of the unit of memory. For example, the unit of memory can be a block of memory (e.g., a block of memory having a number of read counts above a threshold number of read counts) or a plane of memory, and the particular data can be data stored in a particular page of the memory. The controller or the memory can select the particular data from the unit of memory (504). For example, a random page can be selected from the unit of memory, or a particular page can be selected from the unit of memory in a round-robin process. In an example of a round-robin process, each page in a block is selected one-by-one. Determining that the unit of memory satisfies the reliability condition includes determining that portions of the unit of memory satisfy the reliability condition, e.g., such that, when the controller or the memory determines that a block of memory satisfies the reliability condition, the controller or the memory also determines that pages of the block satisfy the reliability condition. Some implementations do not include a data reliability condition check (502): rather, the process 500 can begin with selecting data as particular data to be read (504).

The particular data is read at multiple different read voltages, and corresponding readout data are obtained as results of the reads (506). For example, in some implementations, the memory reads the particular data at a first read voltage and obtains first readout data, and the memory reads the particular data again at a second read voltage and obtains second readout data. The first readout data and the second readout data can be retained on the memory and compared by the memory (e.g., as described in reference to FIG. 6), or the controller can obtain the first readout data and the second readout data and perform the comparison (e.g., as described in reference to FIG. 7). The first read voltage corresponds to $V_1$ in FIG. 4B, and the second read voltage corresponds to $V_2$ in FIG. 4B.

The two read voltages in this example can be predetermined or can be determined by the controller and/or the memory. For example, in some implementations, the controller or the memory determines one or both of the read voltages based on usage data, such as the reliability data that may be employed in element 502. For example, based on usage data characterizing usage of the memory (e.g., a read count of the memory or a portion of the memory, such as a page, block, or sub-block), it can be determined whether data retention degradation or read disturbance are likely to have occurred. If data retention degradation is likely to have occurred, read voltages in-between the two highest-threshold voltage distribution states (e.g., states B and C in FIG. 3) can be selected, such as voltages intermediate between the peaks of distributions 402a and 306 of FIG. 4A. If read disturbance is likely to have occurred, read voltages in-between the two lowest-threshold voltage distribution states (e.g., states ER and A in FIG. 3) can be selected, such as voltages intermediate between the peaks of distributions 302 and 304 of FIG. 4A. These selections correspond to the states most likely to be affected by data retention degradation and read disturbance, respectively: however, voltages between other states can be used instead or additionally. The controller or the memory can identify a particular state to test and, based on the selected state, determine first and second read voltage, such as voltages that are likely to overlap with a distribution corresponding to the state if the distribution has shifted. Moreover, in some implementations, values of the first read voltage and/or second read voltage can be based on the usage data, e.g., to adapt to threshold voltage distribution shifts.

In some implementations, the controller and/or the memory are configured with a default first and/or second read voltage (and, in some cases, additional read voltages for additional reads), and/or a default voltage step $\Delta V$. For example, the default value(s) can be configured as part of manufacture of the controller and/or memory and stored on the controller and/or memory. For example, the default read voltage can be $V_{Rd1}$, be $V_{Rd2}$, or $V_{Rd3}$, e.g., a default read voltage used for reading a state of a memory cell. In some implementations, when a default voltage step is used, the first read voltage is determined by the controller or the memory (e.g., based on usage data or based on a particular state to be assessed), and other read voltage(s) are spaced apart from the first read voltage (and, for multiple other read voltages, one another) by the default voltage step or a multiple of the default voltage step. In some implementations, the multiple of the default voltage step can be determined based on the usage data or based on the particular state to be assessed. For example, the default voltage step may be 0.1 V, and, based on the usage data or other data, the controller or the memory determines whether the difference between $V_1$ and $V_2$ is 0.1, 0.2, 0.3, etc. Values of the first read voltage, the second read voltage, and the difference $\Delta V$ between the first read voltage and the second read voltage can vary in different implementations. In some implementations, the voltage difference $\Delta V$ between the first read voltage and the second read voltage (e.g., between $V_1$ and $V_2$ in FIG. 4B) is in a range between 0.05 V and 0.2 V. A first read voltage or second read voltage may be between 4.4 and 4.6 V, e.g., in order to detect a shift of the highest-threshold voltage distribution.

In implementations in which the controller determines the two different read voltages, the controller can send command(s) to the control logic (e.g., control logic 102) in the memory to cause the memory to generate two read voltages, e.g., by the control logic through a high voltage circuit (e.g., high voltage circuit 106) or by the high voltage circuit, to be applied to the same word line. Data read with the first read voltage is received by page buffer 130a, and data read with the second read voltage is received by page buffer 130b.

The two read voltages, for various error analysis processes, can be between any two threshold voltage distributions. For example, in some implementations, in the case of MLC memory, the two read voltages can be $V_{Rd1}$ and $V_{Rd1}+\Delta V$ or $V_{Rd1}-\Delta V$; $V_{Rd2}$ and $V_{Rd2}+\Delta V$ or $V_{Rd2}-\Delta V$; or $V_{Rd2}$ and $V_{Rd3}+\Delta V$ or $V_{Rd2}-\Delta V$. $\Delta V$ can be the same or different for different $V_{Rdn}$. In the case of SLC memory, there may be a single $V_{Rd}$, and the voltages can be, for example, $V_{Rd}$ and $V_{Rd}+\Delta V$ or $V_{Rd}-\Delta V$.

The multiple readout data are compared, and the controller and/or the memory obtain a comparison result (508). Various different types of comparison can be performed to obtain the comparison result. In some implementations, for the example of two readout data, the comparison is a bitwise comparison between each bit of the first readout data and a corresponding bit of the second data. For example, a bitwise XOR operation can be performed, to obtain data having a length of the first readout data and the second data, where the data is "1" where the readout data are mismatched and "0"

elsewhere. If the first readout data is "1011" and the second readout data is "1001," a bitwise XOR operation returns a result "0010." The bitwise XOR result itself can be used as the comparison result, or the bitwise XOR result can be further processed to obtain the comparison result. For example, the comparison result can be a sum of the bits (number of "1"s) of the bitwise XOR result: the sum of the bits is equal to a number of mismatches between the first readout data and the second readout data and, accordingly, may correlate with a number of data storage errors. Other comparison operations are also within the scope of this disclosure. For example, in some implementations only portion(s) of the first readout data and the second readout data are compared to one another, and/or the first readout data and the second readout data can be compared in chunks (e.g., instead of or in addition to bitwise comparisons).

Figure 7:
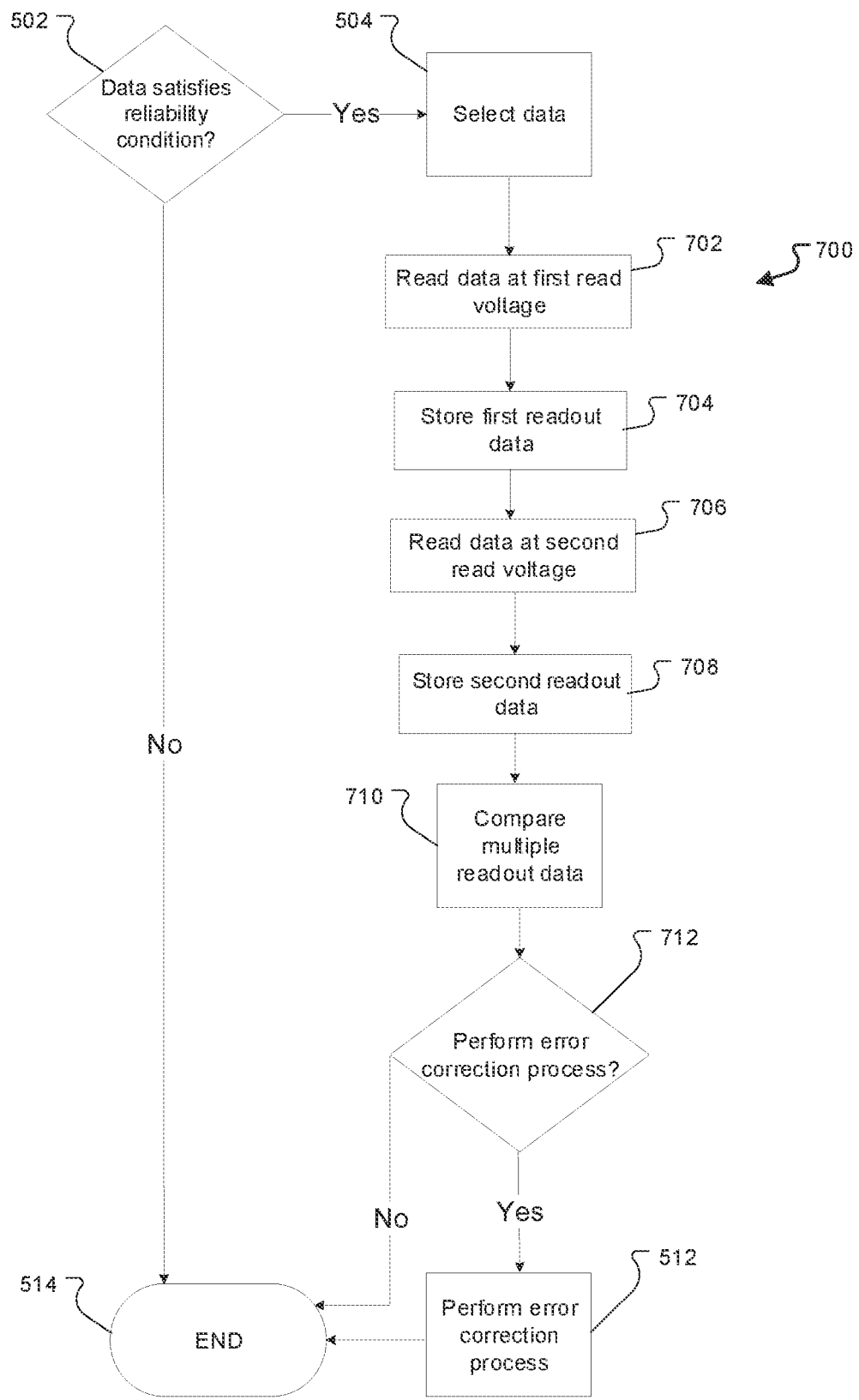
FIG. 7 illustrates an example of an error analysis process in which readout data is transferred to a controller, according to one or more implementations of the present disclosure.
Figure 8:
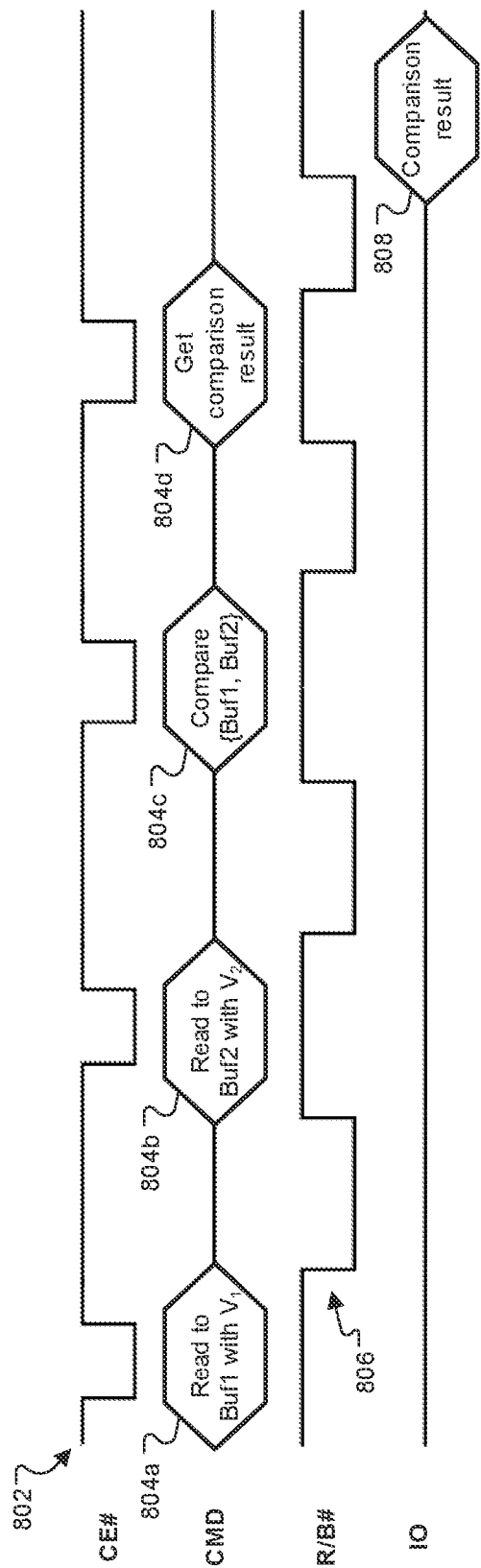
FIGS. 8-10 are timing diagrams illustrating examples of signals, according to one or more implementations of the present disclosure.
Figure 9:
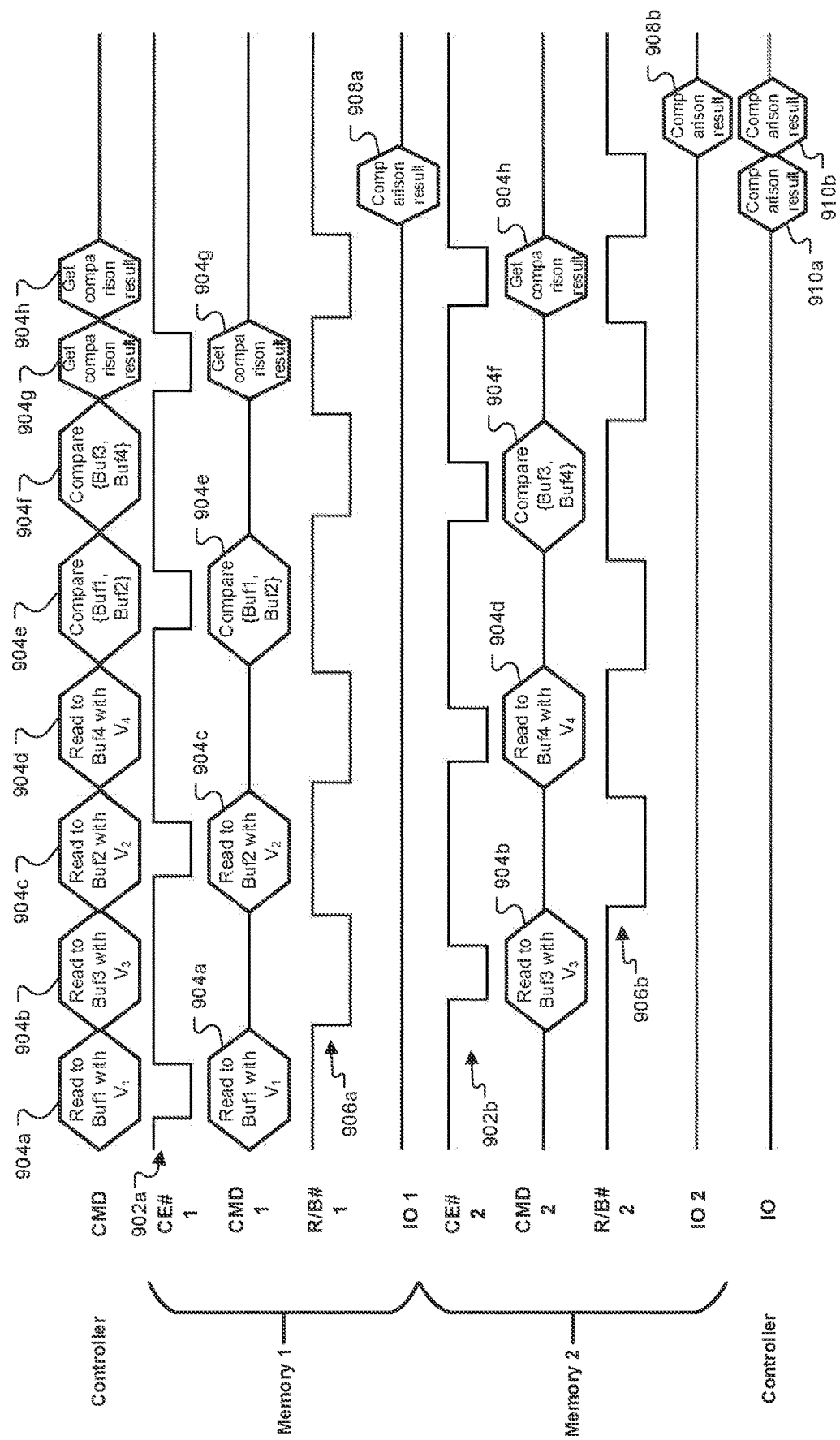
Figure 10:
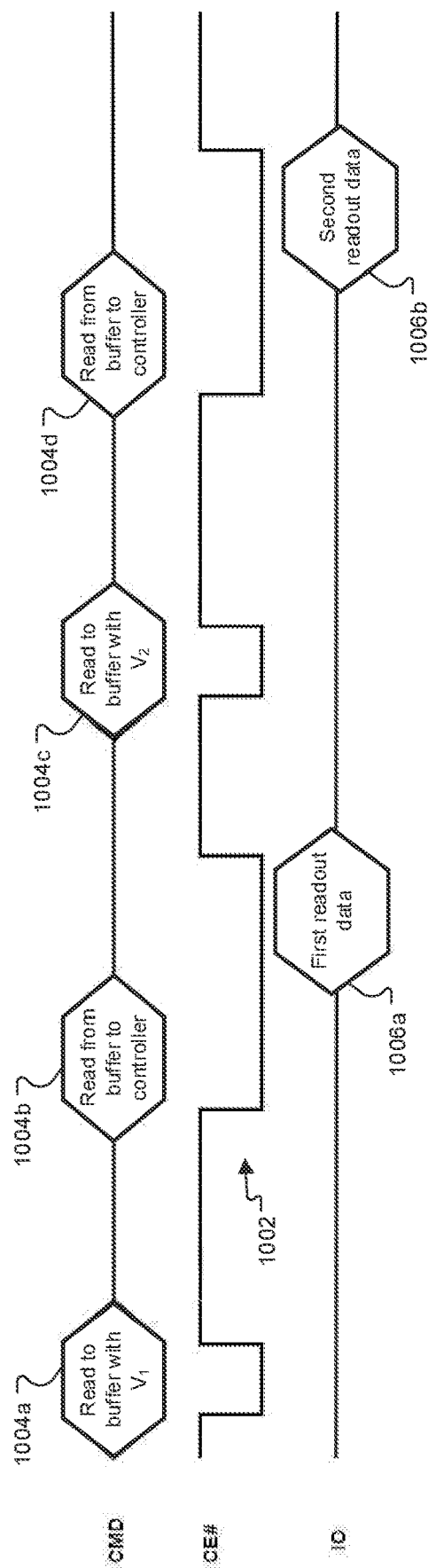

In some implementations, the controller sends command(s) to the memory to cause the memory to perform the reads of the particular data, e.g., as illustrated in FIGS. 8-10. In some implementations, the memory itself selects the particular data and performs the reads. The first readout data and the second readout data can be stored in the memory and compared by the memory (e.g., as described in reference to FIG. 6), or the first readout data and the second readout data can be obtained at the controller, stored at the controller, and compared by the controller (e.g., as described in reference to FIG. 7).

Based on the comparison result, it is determined (e.g., by the controller or the memory) whether to perform an error correction process (510). For example, if the comparison result satisfies a threshold condition (e.g., is greater than or less than a threshold), the error correction process is performed (512): otherwise, the process 500 ends. In some implementations, if the comparison result is indicative of a threshold number of mismatches between the first readout data and the second readout data, the threshold condition is satisfied (512). In the example where the comparison result is a sum of the bitwise XOR bits (number of mismatched bits), the error correction process can be performed in response to the sum being greater than a threshold value. Other threshold conditions based on the comparison result are also within the scope of this disclosure. In some implementations, the comparison result includes one or more values, and the one or more values can be provided into an algorithm or model that provides, as output, a determination of whether the comparison result satisfies the threshold condition. Because, in some implementations, the error correction process only proceeds when the comparison result satisfies the threshold condition, the prior process constitutes a checkpoint to the error correction process, helping preserve power and other device resources by preventing or reducing unnecessary performance of the error correction process.

In some implementations, multiple comparison results are obtained for each particular data, each comparison result corresponding to a different pair of different read voltages used to obtain the readout data described by the comparison result. For example, in the case of MLC memory, pairs readout data can be obtained for two or more different states (e.g., $V_{Rd1}$ and $V_{Rd1}+\Delta V$ to obtain a first pair of readout data, and $V_{Rd2}$ and $V_{Rd2}+\Delta V$ to obtain a second pair of readout data). A comparison result can be determined based on each pair of readout data, and the threshold condition is determined to be satisfied based on the multiple comparison results. For example, if any one of the multiple comparison results satisfies a first threshold condition, the overall threshold condition is determined to be satisfied. As another example, if an average number of mismatches in the multiple pairs of readout data is above a threshold value, the threshold condition can be determined to be satisfied.

Figure 11:
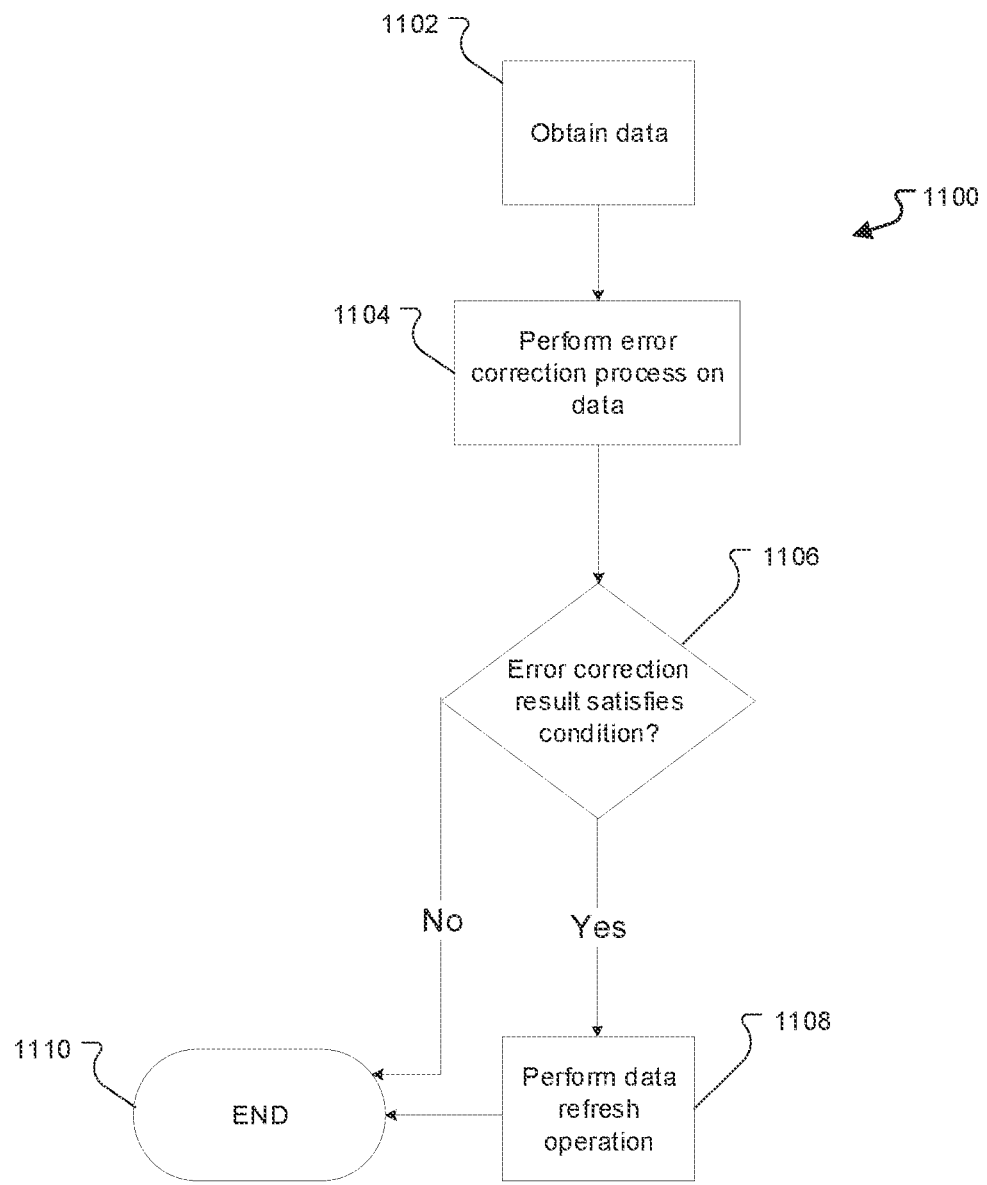
FIG. 11 illustrates an example of an error correction process and data refresh operation, according to one or more implementations of the present disclosure.

FIG. 11 illustrates an example of a process 1100 that can be performed in response to determining, based on the comparison result, to perform the error correction process. In the process 1100, data (e.g., the particular data read two or more times at different read voltages) is obtained (1102). For example, the data can be obtained at the controller from the memory, e.g., read from the memory by the controller. For purposes of obtaining the data in the error correction process, the data can be read at the first read voltage, the second read voltage, or another read voltage. In some implementations, the data has already been obtained at the start of the error correction process 1100 (e.g., during a foregoing error analysis process such as the process 500, 600, or 700), and the data need not be obtained again during the process 1100.

An ECC circuit of the controller (e.g., an ECC circuit including ECC encoder 206 and ECC decoder 208) performs an error correction process on the data, and obtains a result of the error correction process (1104). For example, the error correction process can include determining, for each bit of the data, whether the bit is an error bit and, in some cases, what the correct value for the bit is, in which case the bit may be corrected. This process is distinct from the comparison of the two readout data, which can be used to identify shifts in the threshold voltage distribution but which may not indicate particular error bits. In some implementations, the error correction process itself includes correcting the error bits. For example, if a number of the error bits is low, the data can be correctable by the ECC circuit without requiring a data refresh operation. If the error correction result satisfies a data refresh condition (1106) (for example, exceeds the data refresh threshold), the controller performs a data refresh operation on the data (1108) (e.g., on only the data or on a superset of the data): otherwise, the process 1100 ends (1110). For example, the data refresh condition can be based on a number of error bits in the data, as determined in the error correction process. If the number of error bits exceeds the data refresh threshold associated with the ECC circuit, the data refresh condition is determined to be satisfied. The data refresh operation can include reading the data, obtaining corrected data as a result of error correction, identifying a portion of memory to receive the corrected data (e.g., a block, a page, or a plane), and writing the corrected data to the portion of memory.

The data subject to the error correction process 1100 can be the particular data analyzed in the error analysis process 500, 600, or 700. In some implementations, the data subject to the error correction process 1100 is a superset of the particular data. For example, in some implementations, the particular data can be a page of a sub-block or a block of memory; the error correction process (1104) can be performed on the page; and the data on which the data refresh operation is performed (1108) can be the data in the sub-block or the data in the block. As another example, the particular data can be a subset of data stored in a particular plane of at least one plane of the memory: the error correction process (1104) can be performed on the particular data; and the data on which the data refresh operation is performed (1108) can be the data stored in the particular plane.

Figure 6:
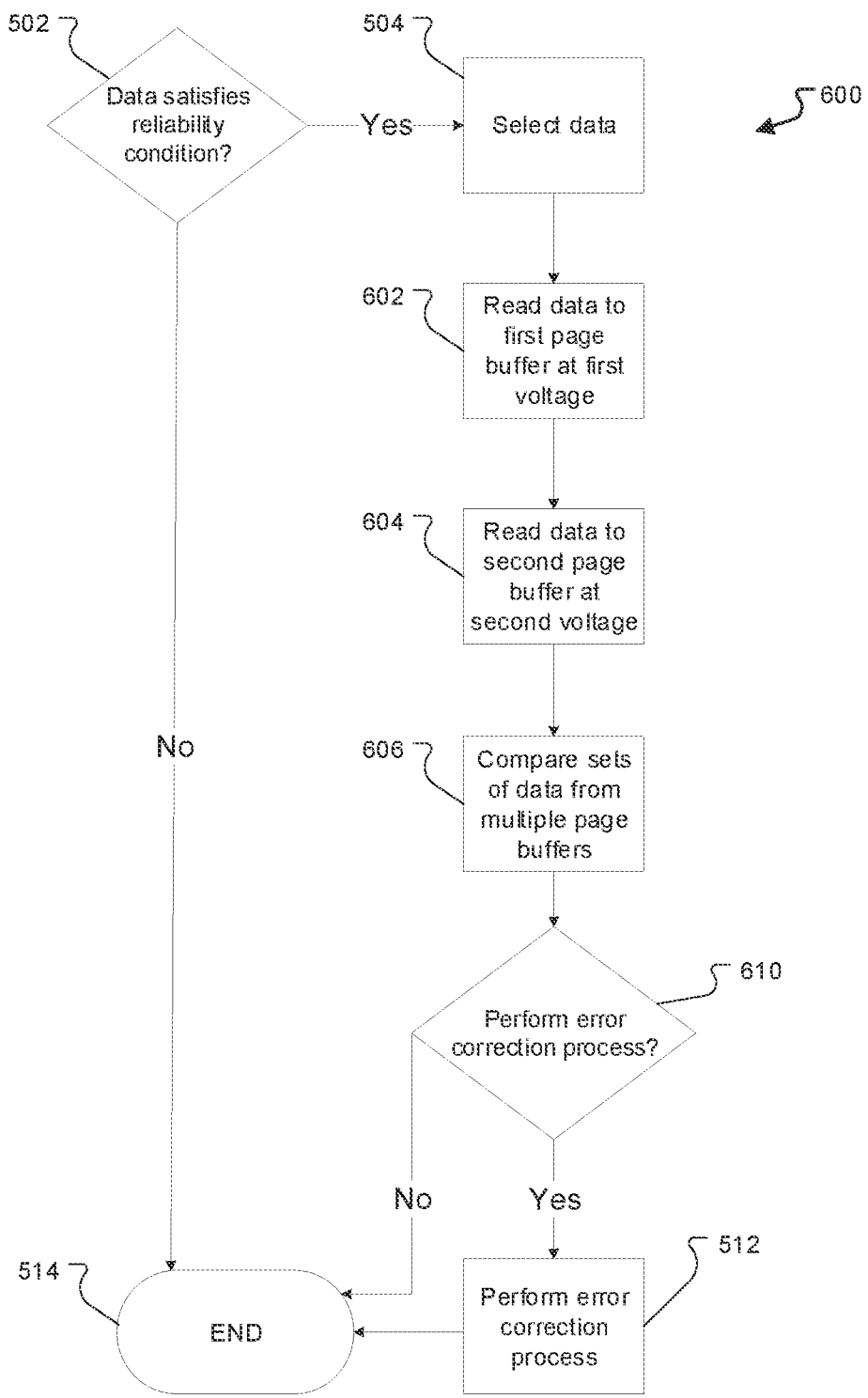
FIG. 6 illustrates an example of an error analysis process in which readout data is stored to multiple page buffers, according to one or more implementations of the present disclosure.

FIG. 6 illustrates a particular example process 600 of the general process 500. Elements of the process 600 can have characteristics as described for corresponding elements of the process 500, except where indicated otherwise.

In the process 600, when the particular data has been selected (e.g., in response to a determination that the particular data satisfies a reliability condition, as described for elements 502 and 504 in reference to FIG. 1), the particular data is read to a first page buffer at a first read voltage, obtaining first readout data in the first page buffer (602), and the particular data is read to a second page buffer at a second, different read voltage, obtaining second readout data in the second page buffer (604). For example, the reads can be performed by the semiconductor device 100 including page buffer circuit 110, which includes two page buffers 130*a*. 130*b* for each plane 150 of the memory array 108. Accordingly, the particular data can be data stored in a particular plane of at least one plane of the memory: the first readout data can be stored in a first page buffer corresponding to the particular plane of the at least one plane; and the second readout data can be stored in a second page buffer corresponding to the particular plane of the at least one plane. Because of the memory's inclusion of the two page buffers corresponding to the particular plane, the first readout data and the second readout data can be stored on the memory simultaneously. As described below; the process 600 can be extended to three or more readout data.

The multiple readout data (e.g., first and second readout data) are compared to one another, and a comparison result is obtained as a result of the comparison (606). For example, the memory can perform the comparison using compare logic 120, which obtains the first readout data and the second readout data from the two page buffers 130*a*, 130*b*. The compare logic is configured to compare the readout data to obtain the comparison result, e.g., by implementing a bit-wise XOR operation and summing the resulting bits, to obtain a number of bits that are mismatched between the first readout data and the second readout data. The compare logic 120 can include any appropriate circuitry for performing comparison operation(s), e.g., hardwired, special-purpose circuitry and/or programmable circuitry. The memory can store the comparison result in the comparison result register 122.

Based on the comparison result, the memory or the controller determines whether to perform an error correction process (610, 512), e.g., as described for element 510 in reference to FIG. 5. For example, in some implementations, the memory makes the determination based on the comparison result, e.g., based on whether the comparison result satisfies a threshold condition. In some implementations, the controller obtains the comparison result from the memory (e.g., from the comparison result register 122 through a pin of the memory), and the controller determines whether to perform the error correction process.

The process 600 does not require that the memory include two page buffers for each plane of the memory. For example, in some implementations, the memory includes two distinct buffers/storage elements for another unit of the memory, e.g., a block or a sub-block, to store first and second readout data from the other unit of the memory. Moreover, in some implementations, the memory includes only a single page buffer for each plane but also includes one or more separate other buffers/storage elements configured to store second readout data from a plane while the first readout data is stored in the single page buffer for the plane. This configuration can allow comparison results to be obtained by the memory even when the memory does not include two page buffers for each plane.

FIG. 8 illustrates examples of signals sent by and/or received at the controller and memory in association with the process 600. The controller brings a chip enable signal 802 low to select the memory (e.g., from among multiple memories that may be coupled to the controller), and the low chip enable signal 802 is received at the memory. The controller outputs a first command 804*a* to the memory to cause the memory to read the particular data to a first page buffer with a first read voltage. For example, the first command 804*a* can include an identifier of a particular page that is to be read, or an identifier of a particular block or a particular plane, the pages of which are to be read in a round-robin process. The particular page or the particular block is included in a particular plane of at least one plane of the memory, and the first page buffer can correspond to the particular plane In some implementations, the first command 804*a* includes/indicates the first read voltage, or the first read voltage can be a default first read voltage used by the memory (e.g., a default value stored on the memory), which need not be specified by the controller in the first command 804*a*.

The controller outputs a second command 804*b* to cause the memory to read the particular data to a second page buffer with a second read voltage. In some embodiments, the second page buffer corresponds to the particular plane. In some implementations, the second command 804*b* does not include an identifier of the particular data, e.g., because the particular data has already been identified in the first command 804*a*. In some implementations, the second command 804*b* does include the identifier. The second command 804*b* can include the second read voltage, or the second read voltage can be a default second read value used by the memory, e.g., a general default second read value or a default difference from the first read value. In some implementations, the memory can determine the second read voltage.

The controller outputs a third command 804*c* to cause the memory to compare the first readout data (contents of the first page buffer) to the second readout data (contents of the second page buffer) and obtain the comparison result, e.g., using compare logic of the memory. The memory stores the comparison result in a comparison result register. The controller outputs a fourth command 804*d* to cause the memory to output the comparison result to an IO pin of the controller from an IO pin of the memory (808). Having received the comparison result, the controller can perform one or more corresponding operations, e.g., determine whether to perform an error correction process based on the comparison result. Throughout performance of the process 600, a ready/busy signal 806 of the memory indicates whether the memory is currently busy (e.g., performing a data read operation or a comparison operation) or whether the memory is ready to receive commands.

The signals illustrated in FIG. 8 are examples: other combinations of signal(s) can instead be used to perform the process 600. For example, in some implementations, the controller can output a single command that causes the memory to read the first and second readout data, determine the comparison result, and/or output the comparison result to the controller, without a separate command for each operation.

In some implementations, a controller is coupled to multiple memories, each of which is configured to read and store multiple readout data corresponding to particular data. For example, each memory can include two page buffers corresponding to each plane of at least one plane of the memory. The controller can output a command to a first memory while a second memory is performing a read operation or data comparison operation, providing for time-efficient analysis of data stored in multiple memories.

For example, FIG. 9 illustrates examples of signals that can be output/received when the process 600 is performed for multiple memories in tandem. A first memory includes first and second page buffers, and a second memory includes third and fourth page buffers. The first and second page buffers correspond to a particular plane of at least one plane of the first memory, and the third and fourth page buffers corresponding to a particular plane of at least one plane of the second memory.

The controller outputs chip enable signals 902a, 902b to the first memory or the second memory, respectively, to indicate whether the controller is providing a command to the first memory or the second memory. The commands include a command 904a to the first memory to read particular data on the first memory (e.g., a specified page of the first memory, or data in a specified plane of the first memory) to the first page buffer at a first read voltage. e.g., as described for command 804a. While the first memory is performing this read operation (as indicated by a low ready/busy signal 906a of the first memory), the controller outputs a command 904b to the second memory to read particular data on the second memory (e.g., a specified page of the second memory, or data in a specified plane of the second memory) to the third page buffer at a third read voltage. While this read operation of the second memory is being performed (as indicated by a low ready/busy signal 906b of the second memory), the first memory has finished the read operation associated with command 904a and is ready to receive a command 904c to read the particular data on the first memory to the second page buffer at a second read voltage that is different from the first read voltage. While this read operation of the first memory is being performed, the second memory has finished the read operation associated with command 904b and is ready to receive a command 904d to read the particular data on the second memory to the fourth page buffer at a fourth read voltage that is different from the third read voltage. The third and fourth read voltages can be the same as or can be different from the first and second read voltages.

A command 904e from the controller to the first memory causes the first memory to compare the two readout data stored in the first and second page buffers, and the first memory obtains a first comparison result. While the first comparison result is being obtained, a command 904f from the controller to the second memory causes the second memory to compare the two readout data stored in the third and fourth page buffers, and the second memory obtains a second comparison result. A command 904g from the controller to the first memory causes the first memory to output the first comparison result to the controller (908a). A command 904h from the controller to the second memory causes the second memory to output the second comparison result to the controller (908b). The first and second comparison results can be received sequentially at the controller (910a. 910b).

Because the commands to the first memory (904a. 904c. 904e. 904g) are interleaved with the commands to the second memory (904b. 904d. 904f. 904h), the process illustrated in FIG. 9 may provide a high degree of time-efficiency, e.g., for a total time to obtain both comparison results, because commands can be sent to one memory while another memory is busy performing an operation. Moreover, processes according to this disclosure, such as the process illustrated in FIG. 9, can result in particular data analysis being performed in tandem/parallel, because one memory (e.g., the second memory) performs at least some associated operations (such as data readout, readout data comparison, and/or comparison result provision) after another memory (e.g., the first memory) has started performing associated operations but before the other memory has finished performing the associated operations. The tandem/parallel performance can itself provide a high degree of time-efficiency by reducing downtime in which a memory is not performing operations. Moreover, compared to processes that may perform readout data comparison off the memory (e.g., at the controller), process 600 can reduce power consumption associated with data transfer by not requiring readout data to be output from the memory.

In some cases, the improved time-efficiency is linked to the memories' inclusion of circuitry configured to store the two readout data separately, e.g., the memories' inclusion of two page buffers for each plane of at least one plane of the memory. This configuration, together with, in some cases, the inclusion of compare logic in each memory, allows readout data storage and comparison to be performed by the memories themselves instead of, or in addition to, by the controller, so that tandem/parallel operations can be performed without readout data storage or readout data comparison being limited by resources of the controller.

The signals illustrated in FIG. 9 are examples, and other signal protocols are also within the scope of this disclosure. For example, the controller can send, to each of the first memory and the second memory, a single command that causes the memory to perform the data readout, readout data comparison, and comparison result provision operations, instead of a separate command associated with each of the operations. In such implementations, the memories may perform their respective operations in a tandem/parallel manner, as noted above. Moreover, although FIG. 9 illustrates tandem operation with two memories, the method and associated signals can be used to control tandem operation of three or more memories, e.g., as in the configuration of FIG. 13.

In some implementations, readout data storage and readout data comparison are performed by the controller. For example, in cases where the memory lacks circuitry to store two readout data simultaneously (e.g., lacks two page buffers for each plane, without other compensating circuitry) and/or lacks circuitry to obtain the comparison result (e.g., lacks compare logic 120), the two readout data can be provided to the controller, which stores the two readout data and compares the two readout data, obtaining the comparison result.

FIG. 7 illustrates an example of a process 700 in which the controller obtains the readout data and performs the readout data comparison. Elements of the process 700 can have characteristics as described for corresponding elements of the processes 500 or 600, except where indicated otherwise.

In the process 700, based on selection of the particular data (504), the memory reads the particular data at a first read voltage, obtaining first readout data (702). For example, the controller can output a command to the memory to cause the memory to perform the read, as described in reference to element 602. The readout data can be stored temporarily on the memory. For example, the particular data can be data from a page of the memory, and the readout data is stored to a page buffer, such as a page buffer corresponding to a plane that includes the page. The first readout data is stored, e.g., stored at the controller (704). For example, the first readout data can be read from the page buffer to the controller, such as output from an IO pin of the memory, received at an IO pin of the controller, and stored in a storage of the controller, e.g., in the internal memory 214. Transfer of the first readout data to the controller (for storage on the controller) can be performed in response to a corresponding command from the controller, or the transfer can be performed based on a prior command, e.g., the command that causes the memory to perform the read using the first read voltage.

The memory reads the particular data at a second read voltage, obtaining second readout data (706). The second readout data is stored (708), e.g., stored on the controller following a transfer of the second readout data from the memory to the controller. For example, the second readout data can be read to the same page buffer as the first readout data was read to, because the first readout data has already been transferred to the controller, leaving the page buffer available. The controller can then read the second readout data from the page buffer. As noted in reference to elements 702 and 704, these operations can be performed in response to respective commands from the controller, or the operations can be performed in response to a prior command from the controller. The second readout data can be received at the controller and stored in the internal memory 214.

The multiple readout data (e.g., first and second readout data) are compared, and a comparison result is obtained (710), e.g., as described in reference to element 508. The comparison can be performed by the controller. For example, the processor 204 can execute instructions that cause the processor 204 to obtain the first readout data and the second readout data from the internal memory 214 and process the readout data to obtain the comparison result. Based on the comparison result, the controller can determine whether to perform an error correction process (712, 512), e.g., as described in reference to element 510, such as based on whether the comparison result satisfies a threshold condition.

FIG. 10 illustrates examples of signals sent by and/or received at the controller and memory in association with the process 700. A chip enable signal 1002 is used by the controller to indicate a memory storing particular data. Command 1004*a* from the controller causes the memory to read the particular data to a buffer of the memory using a first read voltage. For example, the command 1004*a* can indicate a particular page to be read, and the particular data (the data stored in the page) is stored in the page buffer corresponding to the plane that includes the page. As noted for command 804*a* command 1004*a* can indicate a particular first read voltage, or the first read voltage can be determined by the memory or stored in advance on the memory, e.g., as a default first read voltage.

Command 1004*b* from the controller is a read command that results in the controller reading the first readout data from the buffer. For example, command 1004*b* can cause the memory to output the first readout data from an IO pin of the memory (1006*a*).

Command 1004*c* causes the memory to read the particular data at a second read voltage, different from the first read voltage, and store resulting second readout data in the buffer. As noted above, the command 1004*c* can indicate the second read voltage, or the second read voltage can be a default value of the second read voltage or differ from the first read voltage by a default amount, or the second read voltage can be determined by the memory. Command 1004*d* results in the controller reading the second readout data from the buffer, e.g., by causing the memory to output the second readout data from an IO pin of the memory so that the controller receives the second readout data from the IO pin of the memory (1006*b*).

The processes 500, 600, and 700 are described above with respect to two read operations. In some implementations, in the process 500, 600, or 700, the memory and/or the controller perform additional read operations of the particular data using additional read voltages and obtain additional readout data. For example, the memory can read the particular data a third time at a third, different read voltage and obtain corresponding third readout data. The third readout data can then be used in the comparison (whether performed by the controller or the memory) to determine whether the error correction process will be performed.

For example, in a variation of the process 600, the memory can include three page buffers for each plane, and the third readout data can be read to the third page buffer corresponding to the plane of the particular data. The compare logic of the memory can obtain the three readout data from the three page buffers and implement a three-way comparison operation, such as a three-way bitwise XOR operation or another comparison operation that produces a comparison result based on the three readout data. However, the memory need not include three page buffers for each plane to implement the variation of the process 600 with three or more readout data. For example, the memory can obtain first and second readout data stored respectively in first and second page buffers. The memory can perform an operation (e.g., a comparison operation) on the first and second readout data (from the first and second page buffers) to obtain an intermediate result and, further, perform a third read to the first or second page buffer, at the third read voltage, to store the third readout data in the first or second page buffer. Then, based on the intermediate result and the third readout data (from the first or second page buffer), such as by comparing the intermediate result and the third readout data, the memory can obtain the comparison result.

As another example, in a variation of the process 700, the controller obtains the first, second, and third readout data (corresponding to different read voltages) from the memory and stores the first, second, and third readout data on the controller, such as in the internal memory of the controller. The controller performs a comparison operation based on the first, second, and third readout data and obtains, as a result of the comparison operation, the comparison result. The first, second, and third readout data can be obtained sequentially from the memory.

In some implementations, after process 500, 600, or 700, other particular data can be selected and analyzed in the same manner. For example, the controller and the memory can iterate page-by-page across a plane, a block, or a sub-block of memory, to analyze the entire memory. In some implementations, the controller and the memory can analyze a portion of a plane, a block, or a sub-block (e.g., perform process 500, 600, or 700 on a subset of pages of the plane, block, or sub-block) and, based on comparison results of the portion of the block or the sub-block, determine whether to process more of the plane, block, or sub-block. For example, if comparison results for the portion of the plane, block, or sub-block indicate a low number of bit errors (e.g., an average number of bit errors, per page of the portion, below a threshold value), it can be determined that the plane, block, or sub-block is healthy, and further analysis can be discontinued. As another example, if comparison results for the portion of the plane, block, or the sub-block indicate a high number of bit errors (e.g., an average number of bit errors, per page of the portion, above a threshold value), it can be determined that the plane, block, or sub-block is exhibiting data retention degradation or read disturbance, and error correction operations can be performed on the rest of the plane, block, or sub-block, e.g., without requiring further comparisons of readout data read at two or more voltages.

The techniques described in the present disclosure can be implemented in different types or configurations of systems or devices, e.g., as illustrated with further details below in FIGS. 12 to 15. Each system can include a controller (e.g., the controller 200 or host controller 222 of FIG. 2) and one or more semiconductor devices (e.g., semiconductor device 100 or semiconductor device 212, such as a memory).

Figure 12:
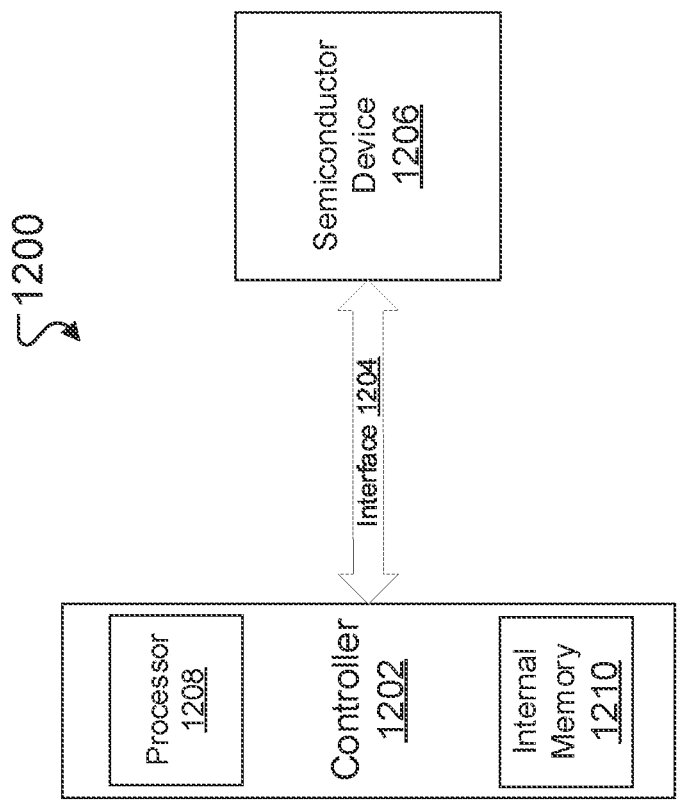
FIG. 12 illustrates an example of a system having a controller and a semiconductor device in a one-to-one configuration, according to one or more implementations of the present disclosure.

FIG. 12 illustrates an example of a system 1200 including a controller 1202 communicatively coupled to a semiconductor device 1206 in a one-to-one configuration. The controller 1202 and the semiconductor device 1206 are coupled by an interface 1204 through which signals from the controller 1202 to the semiconductor device 1206 and vice-versa are transmitted, and the controller 1202 and the semiconductor device 1206 are configured to communicate with one another over the interface 1204, e.g., by appropriate configuration of pins. The controller 1202 and the semiconductor device 1206 are configured to perform operations that including reading particular data at two or more read voltages, e.g., as described in reference to FIGS. 5-11. In some implementations, the semiconductor device 1206 is a flash memory device (e.g., a NAND flash device), and the interface 1204 is a flash memory interface, such as an open NAND flash interface (ONFI) or a toggle interface. The interface 2104 can include a bus, wirings, interconnects, and/or any other component or set of components that can carry signals between the controller 1202 and the semiconductor device 1206. In some implementations, the controller 1202 includes a processor 1208 and an internal memory 1210, as described for controller 200, processor 204, and internal memory 214 of FIG. 2.

Figure 13:
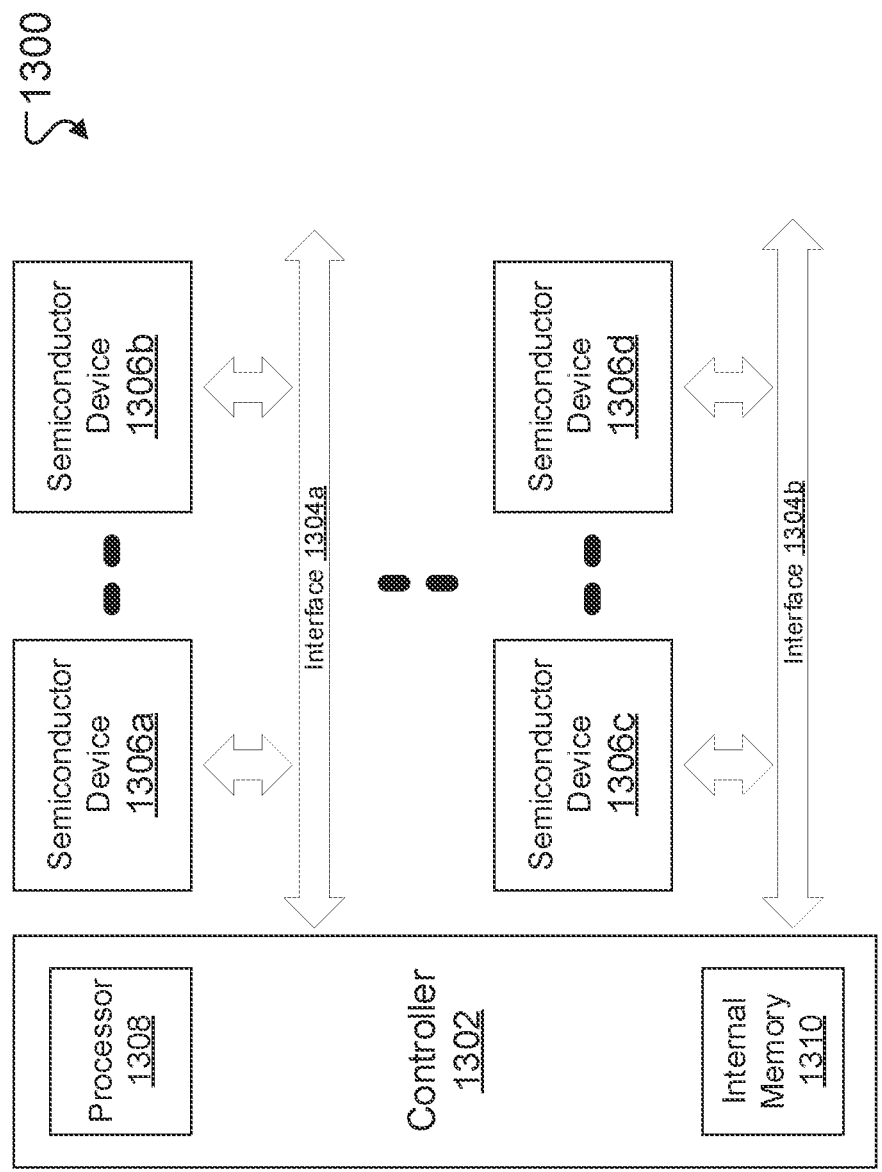
FIG. 13 illustrates an example of a system having a controller, multiple interfaces, and multiple semiconductor devices, according to one or more implementations of the present disclosure.

FIG. 13 illustrates an example of a system 1300 in which a controller 1302 is communicatively coupled to multiple semiconductor devices 1306a-d through multiple interfaces 1304a. 1304b. The controller 1302 can be coupled to one, two, or more interfaces 1304a. 1304b, and each interface 1304a, 1304b can be coupled to one, two, or more semiconductor devices. The controller 1302 can be configured to control the semiconductor devices 1306a-d to obtain a comparison result between two or more readout data representing the same particular data read at two or more read voltages. For example, the controller 1302 can control semiconductor devices 1306a-d to perform associated operations in tandem, as described in reference to FIG. 9, obtaining a comparison result for each semiconductor device 1306a-d. The controller 1302 can select a particular semiconductor device 1306a-d (e.g., using a read enable pin) and perform associated operations with only that semiconductor device, e.g., as described in reference to FIGS. 8 and 10. Elements of FIG. 13 can have the characteristics described for the corresponding elements illustrated in FIG. 12.

Figure 14:
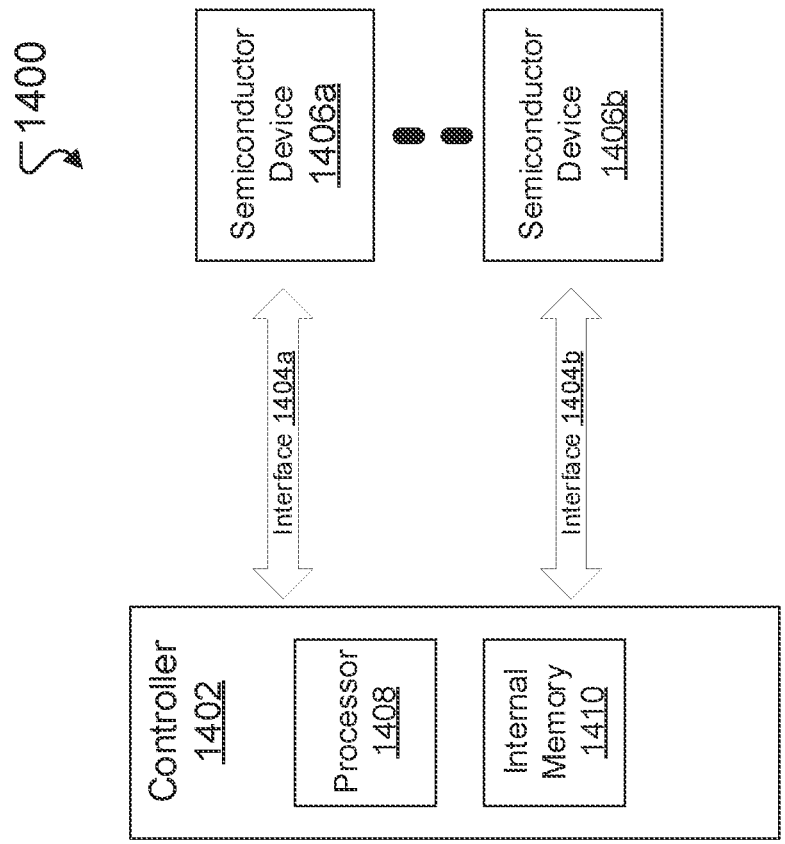
FIG. 14 illustrates an example of a system having a controller and multiple interfaces coupled to respective semiconductor devices, according to one or more implementations of the present disclosure.

FIG. 14 illustrates an example of a system 1400 in which a controller 1402 is communicatively coupled to multiple semiconductor devices 1406a. 1406b through separate interfaces 1404a, 1404b, where the interfaces 1404a. 1404b are provided in a one-to-one relationship with the semiconductor devices 1406a. 1406b. The controller 1402 is configured to control the semiconductor devices 1406a-d to obtain a comparison result between two or more readout data representing the same particular data read at two or more read voltages. Elements of FIG. 14 can have the characteristics described for the corresponding elements illustrated in FIGS. 12-13.

Figure 15:
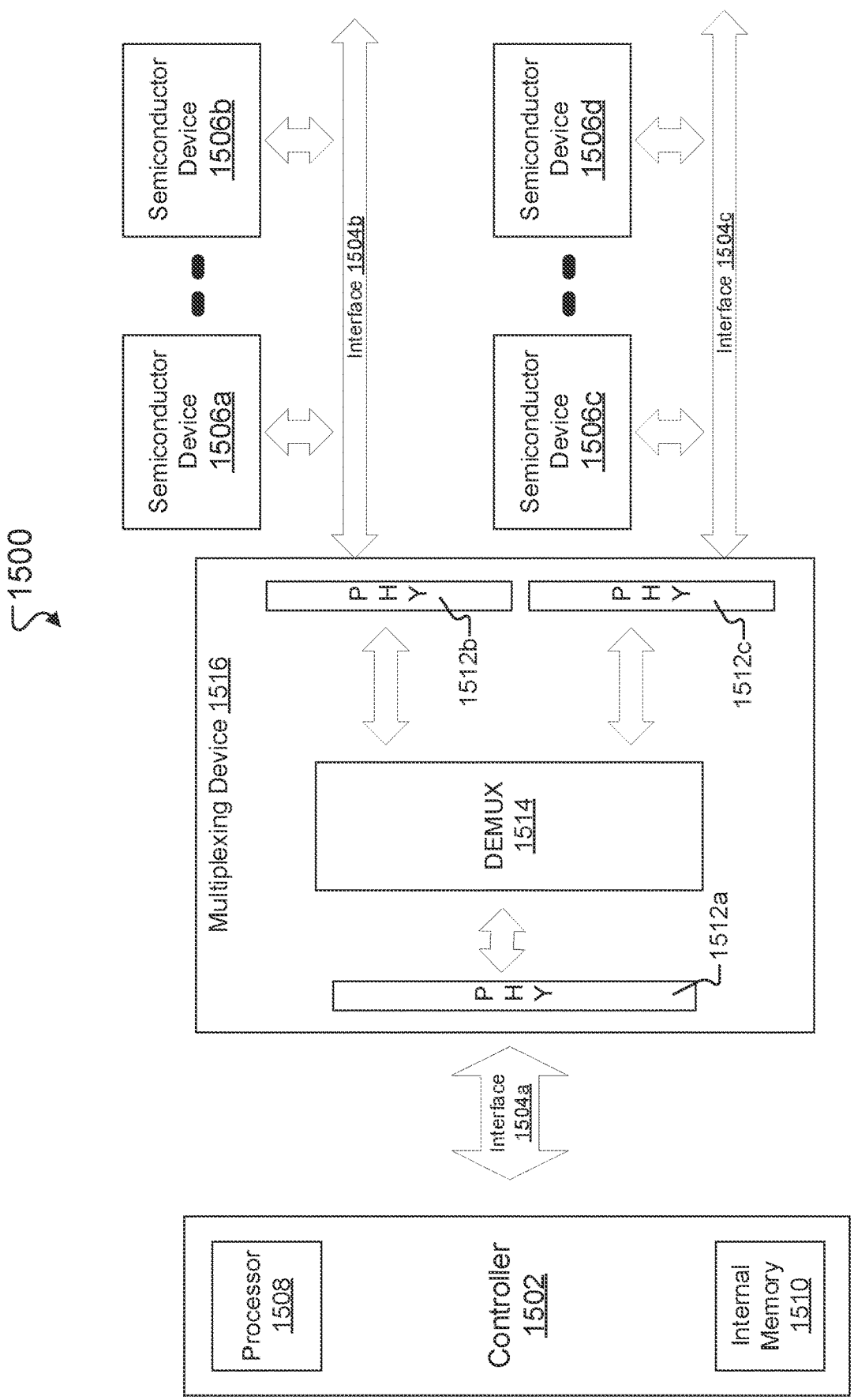
FIG. 15 illustrates an example of a system having a controller, a multiplexing device, and multiple semiconductor devices, according to one or more implementations of the present disclosure.

FIG. 15 illustrates an example of a system 1500 in which a controller 1502 is communicatively coupled to multiple semiconductor devices 1506a-d through a single interface 1504a from the controller 1502. The interface 1504a couples the controller 1502 to a physical layer 1512a (PHY) of a multiplexing device 1516, such as a discrete or integrated multiplexing chip. A demultiplexer 1514 (DEMUX) of the multiplexing device 1516, which may be implemented using software, hardware (e.g., a specialized demultiplexing circuit), or a combination thereof, is configured to switch the common input/out from the controller 1502 over the interface 1504a among multiple interfaces 1504b, 1504c, which are each coupled to the multiplexing device 1516 by a respective PHY 1512b, 1512c, and which are each coupled to one or more semiconductor devices 1506a-d. The PHYs 1512a-c include low-level interconnecting software and/or hardware layers that are configured for compatibility with the interfaces 1504a-c, controller 1502, and semiconductor devices 1506a-d. For example, when the semiconductor devices 1506a-1506d are flash memories, the PHYs 1512a-c can be ONFI PHYs or toggle PHYs. The controller 1502 is configured to control the semiconductor devices 1506a-d to obtain a comparison result between two or more readout data representing the same particular data read at two or more read voltages. Elements of FIG. 15 can have the characteristics described for the corresponding elements illustrated in FIGS. 12-14.

The disclosed and other examples can be implemented as one or more computer program products, for example, one or more modules of computer program instructions encoded on a computer readable medium for execution by, or to control the operation of, a data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can be included in a controller and/or in a semiconductor device such as a memory. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices: magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A system comprising:
a semiconductor device configured to store data; and
a controller communicatively coupled to the semiconductor device,
wherein the semiconductor device and the controller are configured to:
in response to determining that particular data stored in the semiconductor device satisfies a reliability condition,
obtain first readout data by reading the particular data at a first read voltage, and
obtain second readout data by reading the particular data at a second read voltage, wherein the second read voltage is different from the first read voltage:
compare the first readout data and the second readout data and obtain a comparison result; and
based on the comparison result, determine whether to perform an error correction process on the particular data.

2. The system of claim 1, wherein the semiconductor device comprises a first page buffer and a second page buffer, and
wherein the semiconductor device is configured to:
store the first readout data in the first page buffer,
store the second readout data in the second page buffer, and
compare the first readout data in the first page buffer and the second readout data in the second page buffer and obtain the comparison result.

3. The system of claim 2, wherein the semiconductor device comprises:
at least one plane, wherein each plane of the at least one plane comprises a memory array; and
page buffer circuitry coupled to the at least one plane, wherein the page buffer circuitry comprises at least two page buffers for each plane of the at least one plane,
wherein the particular data is stored in a particular plane of the at least one plane, and wherein the first page buffer and the second page buffer are associated with the particular plane of the at least one plane.

4. The system of claim 2, wherein the controller is configured to:
receive the comparison result from the semiconductor device,
in response to determining that the comparison result satisfies a threshold condition, obtain the particular data from the semiconductor device, and
perform the error correction process on the particular data.

5. The system of claim 1, wherein the controller is configured to:
read the particular data from the semiconductor device at the first read voltage, obtain the first readout data, and store the first readout data;
read the particular data from the semiconductor device at the second read voltage, obtain the second readout data, and store the second readout data; and
compare the first readout data and the second readout data and obtain the comparison result.

6. The system of claim 5, wherein the controller is configured to:
in response to determining that the comparison result satisfies a threshold condition, read the particular data from the semiconductor device, and
perform the error correction process on the particular data.

7. The system of claim 1, wherein the controller is configured to, in response to determining that the particular data satisfies a data refresh condition based on a result of the error correction process, perform a data refresh operation on the particular data.

8. The system of claim 7, wherein the controller comprises an ECC circuit configured to perform the error correction process, and
wherein the controller is configured to determine that the particular data satisfies the data refresh condition based on the result of the error correction process by determining that a number of errors detected in the particular data by the ECC circuit exceed a data refresh threshold for the ECC circuit.

9. The system of claim 1, wherein determining that the particular data stored in the semiconductor device satisfies the reliability condition is based on at least one of a number of reads performed on the particular data,
a number of writes performed on the particular data,
a number of erases performed on the particular data, or
a lapsed time period since the particular data was stored in the semiconductor device.

10. The system of claim 1, wherein the first readout data comprises a first plurality of bits, and the second readout data comprises a second plurality of bits,
wherein comparing the first readout data and the second readout data and obtaining the comparison result comprises performing a bitwise comparison between the first plurality of bits and the second plurality of bits, and
wherein the comparison result is based on a number of bits that do not match between the first plurality of bits and the second plurality of bits.

11. The system of claim 1, wherein:
values of the first read voltage and the second read voltage are stored as default values in the semiconductor device; or
the controller is configured to determine at least one of the first read voltage or the second read voltage based on a usage level of the semiconductor device.

12. The system of claim 1, wherein the semiconductor device comprises a NAND Flash memory device.

13. The system of claim 1, wherein the semiconductor device is a first semiconductor device, and the system further comprises a second semiconductor device, and
wherein the controller is configured to cause the first semiconductor device and the second semiconductor device to each read respective particular data at respective two different read voltages.

14. The system of claim 13, wherein the controller is configured to:
send first commands to the first semiconductor device to cause the first semiconductor device to read first particular data at first different read voltages and obtain a first pair of readout data, and to compare the first pair of readout data and obtain a first comparison result,
send second commands to the second semiconductor device to cause the second semiconductor device to read second particular data at second different read voltages and obtain a second pair of readout data, and to compare the second pair of readout data and obtain a second comparison result, and
sequentially receive the first comparison result and the second comparison result,
wherein the first commands are at least partially interleaved with the second commands.

15. The system of claim 1, wherein determining that the particular data satisfies the reliability condition comprises:
determining that a storage unit of the semiconductor device satisfies the reliability condition, wherein the particular data is a subset of data stored in the storage unit.

16. A memory device, comprising:
a first page buffer;
a second page buffer; and
circuitry configured to:
obtain first readout data by reading particular data on the memory device at a first read voltage,
store the first readout data in the first page buffer,
obtain second readout data by reading the particular data on the memory device at a second read voltage, wherein the second read voltage is different from the first read voltage,
store the second readout data in the second page buffer, and
compare the first readout data and the second readout data and obtain a comparison result.

17. The memory device of claim 16, wherein the memory device comprises:
at least one plane, each plane of the at least one plane comprising a memory array, and
page buffer circuitry coupled to the at least one plane;
wherein the page buffer circuitry comprises at least two page buffers for each plane of the at least one plane,
wherein the particular data is stored in a particular plane of the at least one plane, and wherein the first page buffer and the second page buffer are associated with the particular plane.

18. The memory device of claim 16,
wherein the first readout data comprises a first plurality of bits, and the second readout data comprises a second plurality of bits,
wherein comparing the first readout data and the second readout data and obtaining the comparison result comprises performing a bitwise comparison between the first plurality of bits and the second plurality of bits, and
wherein the comparison result is based on a number of bits that do not match between the first plurality of bits and the second plurality of bits.

19. A computer-implemented method comprising:
in response to determining that particular data stored in a semiconductor device satisfies a reliability condition,
obtaining first readout data by reading the particular data at a first read voltage, and
obtaining second readout data by reading the particular data at a second read voltage, wherein the second read voltage is different from the first read voltage;
comparing the first readout data and the second readout data and obtaining a comparison result; and
based on the comparison result, determining whether to perform an error correction process on the particular data.

20. The computer-implemented method of claim 19, comprising:
storing the first readout data in a first page buffer of the semiconductor device,
storing the second readout data in a second page buffer of the semiconductor device, and
comparing the first readout data in the first page buffer and the second readout data in the second page buffer and obtain the comparison result.

* * * * *